(12) United States Patent
Dickson et al.

(10) Patent No.: US 6,574,603 B1
(45) Date of Patent: Jun. 3, 2003

(54) IN-VEHICLE ORDERING

(75) Inventors: Timothy E. Dickson, Greensboro, NC (US); Kenneth O. Marion, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 09/119,905

(22) Filed: Jul. 21, 1998

Related U.S. Application Data

(63) Continuation-in-part of application No. 09/034,969, filed on Mar. 4, 1998.
(60) Provisional application No. 60/060,066, filed on Sep. 26, 1997.

(51) Int. Cl.$^7$ ................................................ G06K 7/00
(52) U.S. Cl. ............................ 705/1; 705/13; 700/241; 235/381; 235/383
(58) Field of Search ..................... 705/13, 1; 235/381, 235/383; 700/241

(56) References Cited

U.S. PATENT DOCUMENTS

| | | | |
|---|---|---|---|
| 3,536,109 A | 10/1970 | Ginsburgh et al. | ............. 141/98 |
| 3,622,924 A | 11/1971 | Crandall et al. | ............... 222/64 |

(List continued on next page.)

FOREIGN PATENT DOCUMENTS

| | | |
|---|---|---|
| DE | 4013147 | 10/1991 |
| EP | 0 461 888 A2 | 6/1991 |
| GB | 2 222 714 A | 3/1990 |
| JP | 04128186 | 4/1992 |
| JP | 6227597 | 8/1994 |
| WO | WO 94/05592 | 3/1994 |
| WO | WO 94/06031 | 3/1994 |

(List continued on next page.)

OTHER PUBLICATIONS

Baumgartner, Fred; "AMFM: Bringing It to the Street"; Communications, Mar. 1990, pp. 26–30.*
CARB—Estimated Hyudrcarbon Emissions of Phase II and Onboard Vapor Recovery Systems; Apr. 13, 1994.

(List continued on next page.)

*Primary Examiner*—Vincent Millin
*Assistant Examiner*—Jagdish N Patel
(74) *Attorney, Agent, or Firm*—Withrow & Terranova PLLC

(57) ABSTRACT

The present invention relates to an in-vehicle interface allowing occupants of the vehicle to place orders from within the vehicle for items provided by a quick-serve restaurant before or after the vehicle reaches a typical order entry position associated with the quick-serve restaurant. Occupants in the vehicle are provided a menu on a display of an in-vehicle interface. The occupants may select any number of desired items to form an occupant order. The occupant order is stored and/or transmitted directly or indirectly to the quick-serve restaurant for processing. Financial information may be sent along with the customer order to effect payment for the occupant order. Preferably, the occupant order is transmitted directly to communication electronics in or associated with a fuel dispenser in an environment associated with a quick-serve restaurant. The dispenser electronics will forward the occupant order to the quick-serve restaurant for processing. Alternatively, the occupant order may be transmitted to the quick-serve restaurant via satellite or ground-based communication systems, which in effect relay information transmitted from the vehicle to communication electronics associated with the quick-serve restaurant.

45 Claims, 27 Drawing Sheets

U.S. PATENT DOCUMENTS

| | | | |
|---|---|---|---|
| 3,642,036 A | 2/1972 | Ginsburgh et al. | 141/94 |
| 3,650,303 A | 3/1972 | Chambers et al. | 141/1 |
| 3,786,421 A | 1/1974 | Wostl et al. | 340/149 |
| 3,814,148 A | 6/1974 | Wostl | 141/98 |
| 4,263,945 A | 4/1981 | Van Ness | 141/98 |
| 4,313,168 A | 1/1982 | Stephens et al. | 364/465 |
| 4,345,146 A | 8/1982 | Story et al. | 235/381 |
| 4,469,149 A | 9/1984 | Walkey et al. | 141/94 |
| 4,490,798 A | 12/1984 | Franks et al. | 365/550 |
| 4,532,511 A | 7/1985 | Lemelson | 340/933 |
| 4,569,421 A * | 2/1986 | Sandstedt | 186/39 |
| 4,600,829 A | 7/1986 | Walton | 236/439 |
| 4,711,994 A | 12/1987 | Greenberg | 235/384 |
| 4,714,925 A | 12/1987 | Bartlett | 340/825.55 |
| 4,728,955 A | 3/1988 | Hane | 3432/140 |
| 4,760,533 A | 7/1988 | Bydlon | 365/465 |
| 4,804,937 A | 2/1989 | Barbiaux et al. | 340/52 |
| 4,846,233 A | 7/1989 | Fockens | 141/94 |
| 4,881,581 A | 11/1989 | Hollerback | 141/113 |
| 4,887,578 A | 12/1989 | Woodcock et al. | 23/519 |
| 4,897,642 A | 1/1990 | DiLullo et al. | 340/825 |
| 4,934,419 A | 6/1990 | Lamont et al. | 141/94 |
| 4,967,366 A | 10/1990 | Kaehler | 365/479 |
| 5,003,472 A * | 3/1991 | Perrill et al. | 364/401 |
| 5,025,253 A | 6/1991 | DiLullo et al. | 340/825.06 |
| 5,058,044 A | 10/1991 | Stewart et al. | 364/551.01 |
| 5,070,328 A | 12/1991 | Fockens | 340/825.54 |
| 5,072,380 A | 12/1991 | Randleman et al. | 364/406 |
| 5,086,389 A | 2/1992 | Hassett et al. | 365/401 |
| 5,128,862 A * | 7/1992 | Mueller | 364/405 |
| 5,131,441 A | 7/1992 | Simpson et al. | 141/209 |
| 5,156,198 A | 10/1992 | Hall | 141/94 |
| 5,184,309 A | 2/1993 | Simpson et al. | 364/510 |
| 5,204,512 A | 4/1993 | Ieki et al. | 235/382 |
| 5,204,819 A | 4/1993 | Ryan | 364/465 |
| 5,217,051 A | 6/1993 | Simpson et al. | 141/59 |
| 5,218,527 A | 6/1993 | Ishikawa et al. | 364/405 |
| 5,238,034 A | 8/1993 | Corfitsen | 141/94 |
| 5,249,612 A | 10/1993 | Parks et al. | 141/219 |
| 5,249,707 A | 10/1993 | Simpson et al. | 222/40 |
| 5,253,162 A | 10/1993 | Hassett et al. | 364/405 |
| 5,267,592 A | 12/1993 | Kaplan et al. | 141/387 |
| 5,327,066 A | 7/1994 | Smith | 320/2 |
| 5,327,945 A | 7/1994 | Simpson et al. | 141/59 |
| 5,343,906 A | 9/1994 | Tibbals, III | 141/83 |
| 5,351,187 A | 9/1994 | Hassett | 364/401 |
| 5,359,522 A | 10/1994 | Ryan | 365/465 |
| 5,363,889 A | 11/1994 | Simpson et al. | 141/208 |
| 5,365,984 A | 11/1994 | Simpson et al. | 141/387 |
| 5,383,500 A | 1/1995 | Dwars et al. | 141/98 |
| 5,392,049 A | 2/1995 | Gunnarsson | 342/42 |
| 5,393,195 A | 2/1995 | Corfitsen | 414/749 |
| 5,414,427 A | 5/1995 | Gunarsson | 342/51 |
| 5,422,624 A | 6/1995 | Smith | 340/438 |
| 5,444,742 A | 8/1995 | Grabow et al. | 375/267 |
| 5,485,520 A | 1/1996 | Chaum et al. | 380/24 |
| 5,495,250 A | 2/1996 | Ghaem et al. | 342/51 |
| 5,499,181 A | 3/1996 | Smith | 365/424 |
| 5,505,234 A | 4/1996 | Simpson et al. | 141/206 |
| 5,541,835 A | 7/1996 | Dextraze et al. | 364/401 |
| 5,552,789 A | 9/1996 | Schuermann | 342/42 |
| 5,557,268 A | 9/1996 | Hughes et al. | 340/933 |
| 5,562,133 A | 10/1996 | Mitchell | 141/206 |
| 5,605,182 A | 2/1997 | Oberrecht et al. | 141/94 |
| 5,609,190 A | 3/1997 | Anderson et al. | 141/59 |
| 5,621,411 A | 4/1997 | Hagl et al. | 342/42 |
| 5,621,412 A | 4/1997 | Sharpe et al. | 342/51 |
| 5,628,351 A | 5/1997 | Ramsey, Jr. et al. | 141/98 |
| 5,671,786 A | 9/1997 | Corfitsen | 141/94 |
| 5,717,374 A | 2/1998 | Smith | 340/438 |

FOREIGN PATENT DOCUMENTS

| | | |
|---|---|---|
| WO | WO 9514612 | 6/1995 |
| WO | WO 95/32919 | 12/1995 |
| WO | Wo 96/28791 | 9/1996 |
| WO | WO 9639351 | 12/1996 |
| WO | WO 97/24689 | 7/1997 |
| WO | WO 97/35284 | 9/1997 |
| WO | PCT/GB 98/02919 | 12/1998 |

OTHER PUBLICATIONS

CARB—Staff's Proposesd Recommendation For The Adoption Of The United States Environmental Protection Agency's Vehicle Refueling Standard and Test Procedures; Apr. 27, 1994.

Micron Communications, Inc.—Meeting Notice dated Feb. 4, 1997.

SAE Meeting Notice; May 27, 1997.

SAE ORVR Task Force Meeting Agenda; May 29, 1997.

* cited by examiner

IN-VEHICLE ORDERING

This application is a continuation-in-part of U.S. application Ser. No. 09/034,969, filed Mar. 4, 1998, which claims the benefit of U.S. Provisional Application No. 60/060,066, filed Sep. 26, 1997.

BACKGROUND OF THE INVENTION

The present invention relates generally to remote ordering systems and, more particularly, to remote ordering systems allowing vehicle occupants to place orders from within the vehicle and monitoring vehicle movement within and throughout a fueling and/or restaurant environment.

In recent years, traditional gasoline pumps and service stations have evolved into elaborate point-of-sale (POS) devices having sophisticated control electronics and user interfaces with large displays and touch-pads or screens. The dispensers include various types of payment means, such as card readers and cash acceptors, to expedite and further enhance fueling transactions. A customer is not limited to the purchase of fuel at the dispenser. More recent dispensers allow the customer to purchase services, such as car washes, and goods, such as fast food or convenience store products at the dispenser. Once purchased, the customer need only pick up the goods and services at the station store or the outlet of a vending machine.

Remote transaction systems have evolved wherein the fuel dispenser is adapted to communicate with various types of remote communication devices, such as transponders, to provide various types of identification and information to the fuel dispenser automatically. These systems are known to facilitate communications of various types of information between a vehicle and other stations, such as fuel dispensers, toll booths, and parking facilities. The more sophisticated systems provide a transponder on the vehicle configured to communicate with a fuel dispenser wherein identification and financial information is sent from the vehicle to the fuel dispenser to effect payment for fueling.

Systems also exist which allow a customer to order food from a menu at the fuel dispenser interface, however, a customer paying for gas using the transponder must still pay for food at the dispenser or at the quick-serve restaurant from which the food is being ordered. Thus, a first drawback is that the customer is required to pay for fuel using the transponder and pay for any items ordered from the quick-serve restaurant by some other means, preferably a debit or credit card. Another drawback is that other occupants in the vehicle cannot see or interact with the dispenser interface to determine and select the items desired for the order. For example, if four people are in the vehicle, only the person dispensing fuel is privy to the items available for order and their respective prices. A further disadvantage of placing food orders at a fuel dispenser is that such ordering increases the amount of time a vehicle is at a particular fueling position, which may result in increased congestion and lost profits due to potential customers selecting an apparently less congested fueling environment. Thus, merging the relatively new transponder transactions with ordering food at a dispenser may result in a decrease in fueling and ordering efficiencies - a result in stark contrast to the goals of each of these systems.

SUMMARY OF THE INVENTION

The present invention provides a solution to the disadvantages associated with the latest trends in quick-serve restaurant environments and, in particular, quick-serve restaurant environments associated with fuel dispensing. The present invention relates to an in-vehicle controller (IVC) having an interface allowing occupants of the vehicle to place orders from within the vehicle for items provided by a quick-serve restaurant before or after the vehicle reaches a typical order entry position associated with the quick-serve restaurant. Occupants in the vehicle are provided a menu on a display of an in-vehicle interface. The occupants may select any number of desired items to form an occupant order. The occupant order is stored and/or transmitted directly or indirectly to the quick-serve restaurant for processing. Financial information may be sent along with the customer order to effect payment for the occupant order. Preferably, the occupant order is transmitted directly to communication electronics in or associated with a fuel dispenser in an environment associated with a quick-serve restaurant. The dispenser electronics will forward the occupant order to the quick-serve restaurant for processing. Alternatively, the occupant order may be transmitted to the quick-serve restaurant via satellite or ground-based communication systems, which in effect relay information transmitted from the vehicle to communication electronics associated with the quickserve restaurant. In other words, the invention relates to the transmission of an occupant order, which was entered from within a vehicle, to the quick-serve restaurant for processing.

The occupant order may be substantially immediately transmitted for processing, or the occupant order may be held for any amount of time before being transmitted. For example, the occupants of the vehicle may enter their order prior to arriving at a fueling and quick-serve restaurant environment wherein the order is actually transmitted to the fuel dispenser upon arrival at a particular fueling position. At that point, the order is passed to the quick-serve restaurant for processing while the occupant fuels the vehicle.

Another aspect of the present invention may relate to monitoring a vehicle's position throughout a fueling environment in order to associate orders placed from within the vehicle with a particular customer or vehicle at an appropriate receiving point. The receiving point may be a pick-up window at a quick-serve restaurant drive-thru, a car wash terminal, or any other point adapted to receive products or services ordered from the vehicle. In addition to associating the appropriate customer with the order being picked up, operators of a quick-serve restaurant (QSR) can monitor or detect the position of the vehicle in the drive-thru lane or elsewhere in the fueling environment as well as determine when to start order preparation.

The customer may choose to pay for the order automatically as described above, along with the fuel at the dispenser, at the order pick-up position, or at one of the in-store registers associated with the QSR or the convenience store. Assuming that the transaction was paid for automatically or at the dispenser along with the fuel, the customer may enter the vehicle and proceed to drive around the fuel station store along a drive-thru lane and pass a customer position monitor. As the customer approaches the customer position monitor, a drive-thru position interrogator may be used to receive a signal from the vehicle indicating the customer is at a known position in the drive-thru lane. At this point, a control system will alert the food preparation area to prepare the order and indicate to an order pick-up interface and controller the position of the vehicle in the drive-thru lane. Once the customer reaches the order pick-up window, the order pick-up interrogator will determine the presence of the customer vehicle and associate the occupant order accordingly so that the drive-thru window operator can deliver the freshly prepared order to the correct customer.

Accordingly, one aspect of the present invention may provide a remote ordering system configured to communicate with an in-vehicle order interface. The ordering system includes communication electronics adapted to ultimately communicate with vehicle communication electronics associated with an in-vehicle order interface and an order processing terminal at a quick-serve restaurant adapted to display an occupant order to a food processor. The system will also include a control system associated with the communication electronics and the occupant order processing terminal. The control system is configured to receive the occupant order via the communication electronics, send the occupant order to the order processing terminal for processing, receive account information, and effect payment for the order based on the occupant account information.

The in-vehicle order interface may take on many configurations, all of which will include a display and input device operating in conjunction with a controller to provide a menu to an occupant and recognize items selected by the occupant through the input device. The in-vehicle interface will also be associated with communication electronics configured to transmit the occupant order and, preferably, account information, for ultimate receipt at the ordering system. Such communications may be direct, via satellite or via ground relay, such as a cellular communication system. As noted, the preferred embodiment is found in a fueling environment associated with a quick-serve restaurant wherein communications are sent to dispenser communication electronics or communication electronics associated with the dispenser or dispensing area. The order received at the dispenser or in the dispensing area is transmitted to the quick-serve restaurant for processing.

Another aspect of the present invention may provide a multistage ordering system. The system may include first remote communications electronics adapted to communicate with an in-vehicle occupant order system. An order receipt position apart from the fuel dispenser is provided and includes second remote communications electronics adapted to communicate with the in-vehicle occupant order system, a receipt position output indicating the vehicle associated with the order is at the order receipt location, and an intermediate location output indicating the vehicle is locating position. An intermediate locating position located along the path of travel between the fuel dispenser and the order receipt position is also provided. The intermediate locating position has a third remote communications electronics adapted to communicate with the in-vehicle occupant order system. The control system is associated with each of the communications electronics.

The control system is preferably adapted to ultimately communicate with the in-vehicle occupant order system through the first communications electronics when the in-vehicle occupant order system is proximate a fuel dispenser, associate the occupant order with the vehicle or occupant, and communicate with the in-vehicle occupant order system through the third remote communications electronics when the remote communications unit is proximate the intermediate locating position. When the vehicle is proximate the intermediate locating position, the control system provides an intermediate location output in order to determine the location of the customer between the dispenser and order receipt location. The control system will again communicate with the in-vehicle occupant order system at the order receipt location when the customer arrives to pick up the order. The control system will identify the order at the receipt location for the particular customer who placed the order at the order entry interface of the fuel dispenser.

Typically, the order receipt location is associated with a quick-serve restaurant wherein the customer may pick up the food ordered from within the vehicle. The order receipt location is further associated with an order preparation location having an order preparation output. The control system may also be associated with the order preparation output and adapted to control the order preparation output to indicate the customer associated with the order is at the intermediate location wherein processing the order for the customer is effected when the customer is determined to be at the intermediate location.

The present invention solves the unique problems associated with keeping track of orders from a QSR in a fueling environment. In such an environment, orders for pick up at the drive-thru window, or within the store for that matter, may be placed in a different sequence than that in which they are actually picked up. The reason for the possible discrepancy in order placement and order pick-up arises because the orders can be placed at several locations, including from within the vehicle, at one of the many fuel dispensers interfaces, and the traditional order entry interface of QSR. In particular, those customers placing orders at the dispenser will most likely intermingle in the drive-thru line with those placing orders at the order entry interface. The present invention uses transponders to appropriately associate orders placed at different locations with the appropriate customer at a common pick-up location.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
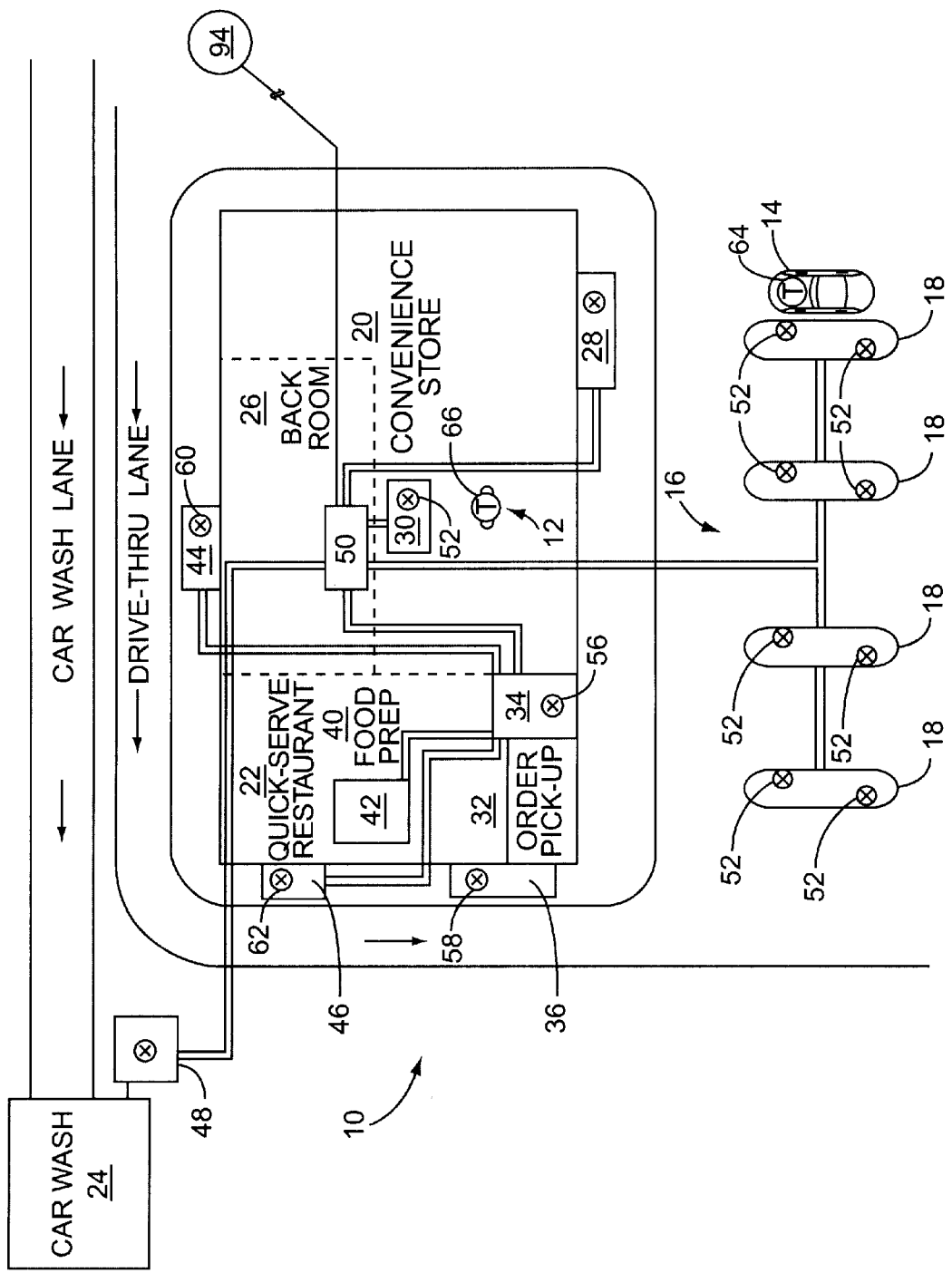
FIG. 1 is a schematic representation of a fueling and retail environment constructed according to the present invention.

In the following description, like reference characters designate like or corresponding parts throughout the several figures. It should be understood that the illustrations are for the purpose of describing preferred embodiments of the invention and are not intended to limit the invention thereto. Given the extensive nature of the present application, an overview of the necessary hardware for the various areas in the fueling and restaurant environment will be discussed followed by a description of the various functional aspects of the system and how a vehicle and customer will interact with the system during various types of transactions. Notably, the various aspects discussed herein may constitute subject matter covered by the accompanying claims alone or in combination.

As best seen in FIG. 1, a fueling and retail environment, generally designated 10, is shown constructed according to the present invention. The fueling and retail environment provides customers 12 the opportunity to purchase fuel for their vehicles 14 as well as other goods and services, such as fast food and car washes. The fueling and retail environment 10 may include one or more of a forecourt 16, where the fuel dispensers 18 are located, a convenience or fuel station store 20, one or more quick-serve restaurants (QSR) 22, a car wash 24, and a backroom 26. The backroom 26 is generally the central control area for integrating or coordinating control of the dispensers 18, convenience store 20, QSR 22, and car wash 24.

The convenience store 20 typically includes an inventory of a wide assortment of products, ranging from beverages and foods to household goods. The convenience store includes a transaction terminal or register 30, where a customer 12 may purchase convenience store products, fuel, car washes or QSR food.

The QSR 22 generally includes an order pick-up area 32 having a QSR transaction terminal or register 34 located within the convenience store and a drive-thru terminal and window 36. Depending on the application, the QSR transaction terminal 34 and drive-thru terminal 36 may be separated or integrated in any fashion. Usually, customers are able to place orders at the QSR transaction terminal 34 in the store as well as pick up orders in conventional drive-thru style at drive-thru terminal 36.

The QSR 22 may also include a food preparation area 40, a food preparation interface 42 for providing order instruction to QSR food preparers, a drive-thru order placement interface 44 for placing drive-thru orders in a conventional manner, and a customer position monitor 46 for determining the location or position of a customer in line to pick up a QSR order at the drive-thru window 36. Notably, the drive-thru and car wash lanes depicted in FIG. I are designed to control the flow of traffic through the respective lanes and aid to ensure vehicles, and their respective transponders, pass by the various interrogation points in the fueling environment as desired.

The car wash 24 includes a car wash interface 48 that interacts with the customer and controls the automatic car wash system (not shown), which may be any suitable automatic car wash. Preferably, a customer 12 will be able to order a car wash at a fuel dispenser 18, at the transaction terminal or register 30 of the convenience store 20, at the QSR transaction terminal 34, or at the car wash interface 48 directly. Similarly, customers are able to order fast-food items from the QSR 22 from various locations in the fueling environment 10, including at the fuel dispensers 18, drive-thru order placement interface 44, and the in-store QSR terminal 34.

Although various overall system and control integration schemes are available, the four major parts of the fueling environment 10——forecourt 16, convenience store 20, QSR 22 and car wash 24——typically interface at the backroom 26 using a central control system 50. The central control system 50 may include any number of individual controllers from the various parts of the fueling environment 10 to provide overall system control and integration. The central control system 50 may interface with the fuel dispensers 18, transaction terminal 30, QSR transaction terminal 34 and the car wash interface 48. Preferably the drive-thru terminal 36, drive-thru order placement interface 44 and customer position monitor 46 directly interface with the QSR terminal 34 in order to integrate the QSR functions prior to interfacing with the central control system 50.

However, those of ordinary skill in the art will recognize several control variations capable of implementing an integrated system. Additionally, an automated vending system 28 may also interface with the central control system 50 or directly with any one of the other areas of the fueling environment 10, such as the fuel dispensers 18, in order to allow a customer 12 to purchase products from the vending system 28 at a remote location.

The present invention relates generally to providing remote communications between the customer 12 in vehicle 14 and various parts of the fueling environment briefly described above. In short, many areas within the fueling environment 10 will be equipped with communication electronics capable of providing uni- or bi-directional communications with the customer in vehicle 14 via a remote communications device associated with an occupant interface and controller. The communication electronics will typically include a transmitter for transmitting signals to the remote communications device and a receiver for receiving signals emanating from the remote communications device. The communications electronics of the vehicle or IVC may also include a receiver and transmitter. The transmitter and receiver of the remote communications device may separately receive and separately transmit signals in cooperation with an associated control system or may be configured so that the transmitter actually operates on and modifies a signal received from the communication electronics in the fueling environment 10. The latter embodiment encompasses traditional transponder-type communication systems wherein the remote communications device may be either passive or active.

For the sake of conciseness and readability, the term "transponder" will be used herein to describe any type of remote communications device or electronics associated with an IVC and capable of directly or indirectly communicating with the communication electronics of the fueling environment 10 or QSR 22. The remote communications device may include traditional receivers and: transmitters alone or in combination as well as traditional transponder electronics adapted to respond and/or modify an original signal to provide a transmit signal. A transponder as defined herein may provide either unidirectional or bi-directional communications for an IVC.

Likewise, the communication electronics associated with the various aspects of the fueling environment 10 will be called an "interrogator." An interrogator will generally include a transmitter and receiver capable of communicating with a transponder as defined above. Please note that an interrogator, as defined herein, need not contain both a receiver and a transmitter for various aspects of the invention.

Figure 2A:
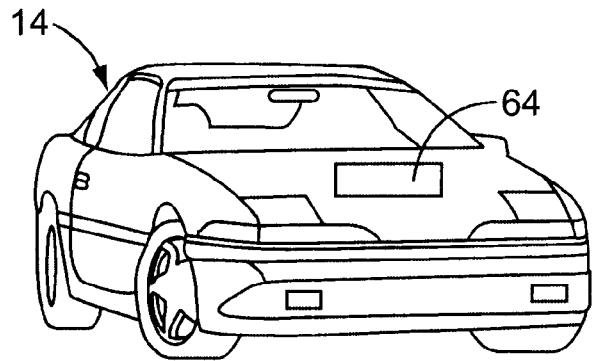
FIG. 2A depicts a vehicle having a vehicle-mounted controller constructed according to the present invention.
Figure 2B:
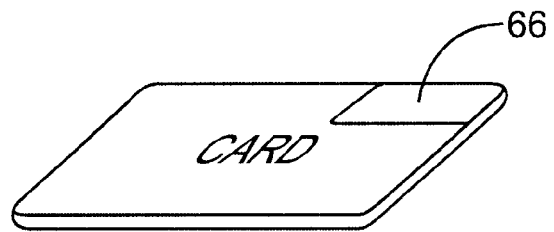
FIG. 2B depicts a personal transponder integrated into a debit/credit or smartcard constructed according to the present invention.
Figure 2C:
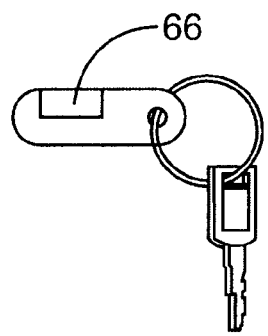
FIG. 2C depicts a personal transponder integrated into key fob constructed according to the present invention.

With the above in mind, the fueling environment 10 may include many interrogators of varying capability. These interrogators may include: dispenser interrogators 52, a store transaction interrogator 54, a QSR transaction interrogator 56, a drive-thru pick-up interrogator 58, a drive-thru order interrogator 60, and a drive-thru position interrogator 62. As shown in FIGS. 2A, 2B and 2C, the dispenser interrogator 52 is generally adapted to communicate with vehicle-mounted IVC transponders 64 and/or personal transponders 66. The personal transponder 66 may be mounted on a key fob 68, a wallet card 70, or any other device typically carried by the customer 12, as shown in FIGS. 2B and 2C. FIG. 2A depicts a vehicle 14 having a vehicle-mounted transponder 64.

Figure 3:
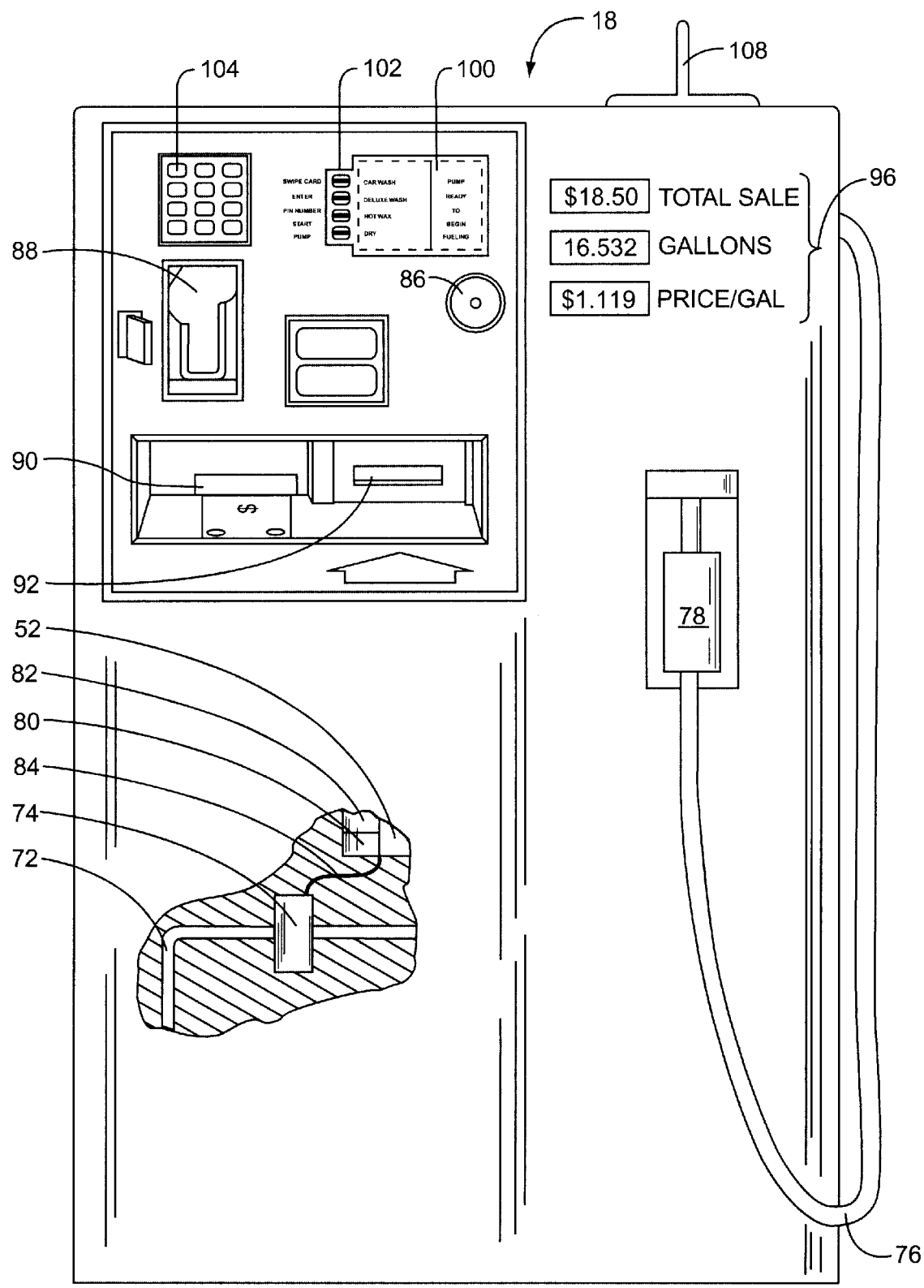
FIG. 3 depicts a fuel dispenser shown constructed according to the present invention.

As best seen in FIG. 3, a fuel dispenser 18 is shown constructed according to and as part of the present invention. The dispenser provides a fuel delivery path from an underground storage tank (not shown) to a vehicle 14, (shown in FIGS. 1 and 2A). The delivery path includes a fuel delivery line 72 having a fuel metering device 74. The fuel delivery line 72 communicates with a fuel delivery hose 76 outside of the dispenser 18 and a delivery nozzle 78. The nozzle 78 provides manual control of fuel delivery to the vehicle 14.

The dispenser 18 also includes a dispenser control system 80 having one or more controllers and associated memory 82. The dispenser control system 80 may receive volume data from the metering device 74 through cabling 84 as well as provide control of fuel delivery. The dispenser control system 80 may provide audible signals to an audio module and speaker 86 in order to provide various beeps, tones and audible messages to a customer. These messages may include warnings, instructions and advertising.

The dispenser 18 is preferably equipped with a payment acceptor, such as a card reader 88 or cash acceptor 90, along with a receipt printer 92. With these options, the dispenser control system 80 may read data from the magnetic strip of a card inserted in the card reader 88 or receive cash from a customer and communicate such information to the central control system 50 (as shown in FIG. 1), such as the G-site controller sold by Gilbarco Inc., 7300 West Friendly Avenue, Greensboro, N.C. The central control system 50 typically communicates with a remote network 94, such as a card verification authority, to ascertain whether a transaction proposed to be charged to or debited from an account associated with the card inserted in the card reader 88 is authorized.

The dispenser 18 will include one or more types of displays, preferably one or more alpha-numeric displays 96 together with a high-resolution graphics display 100.

The graphics display 100 will generally have an associated key pad 102 adjacent to the display or integrated with the display to provide a touch interface. The dispenser may include an additional, auxiliary key pad 104 associated with the card reader 88 for entering secret codes or personal identification numbers (PIN's). Notably, the displays 96, 100 and key pads 102, 104 may be integrated into a single device and/or touch interface. The dispenser control system 80 is preferably comparable to the microprocessor-based control systems used in CRIND (card reader in dispenser) and TRIND (tag or transponder reader in dispenser) type units sold by Gilbarco Inc. under the trademark THE ADVANTAGE.

As noted, the dispenser control system 80 may include or be associated with dispenser communication electronics referred to as interrogator 52 for providing remote unidirectional or bidirectional communications between a transponder and the dispenser. These transponders may incorporate RFID technology developed by any number of companies including Texas Instruments or Micron Communications.

When looking for new vehicle tags, the Texas Instruments system (TIRIS) repetitively transmits a poll signal through its LF (Low Frequency: 134.2 kHz) forward link antenna, an oblong coil of wire (about 6 or 7 turns) positioned above the fueling area much like a basketball goal. This antenna creates a well-defined zone in which this forward link signal can be detected by a tag within a 7-foot radius of the fueling area.

A tag receiving this forward link then broadcasts a return link signal through its UHF (Ultra High Frequency: 903.0 MHz) antenna, which is received by the TIRIS system through a UHF receiver. This signal can also be detected by multiple dispensers and can cause transmitting tags to interfere with each other. However, TI has developed a staggered polling scheme within a site in which individual TIRIS interrogators corresponding to individual dispensers transmit their poll signals at different rates depending on an address setting. This helps ensure that each return link signal will be detected individually within a matter of milliseconds.

The fact that the return link signal can be received at multiple dispensers does not cause an uncertainty of tag location. This is because every return link signal contains a number corresponding to the address of the interrogator sending the forward link. Also, since the forward link is confined to a narrow zone, a tag is associated with a particular dispenser without a site-wide arbitration algorithm. However, the TRIND Gateway still provides a signal strength number in case an arbitration algorithm is present.

The Micron Microstamp™ produced by Micron Communications, Inc., 8000 South Federal Way, Boise, Id. 83707-0006 is an integrated system implementing a communications platform referred to as the Microstamp™ standard on a single CMOS chip. A detailed description of the Microstamp™ engine and the method of communication is provided in its data sheets in the Micron Microstamp™ Standard Programmers Reference Manual provided by Micron Communications, Inc. These references and the information provided by Micron Communications on their web site at http://www.mncc.micron.com are incorporated herein by reference. Although the preferred communications method includes radio frequencies in the microwave range, these communications may include other RF, infrared, acoustic or other known remote communication methods acceptable for use in a fueling environment. Additionally, the dispenser 18 may include one or more antennas 108 associated with the dispenser interrogator 52.

Attention is drawn to U.S. Pat. Nos. 5,621,913; 5,608,739; 5,583,850; 5,572,226; 5,558,679; 5,557,780; 5,552,743; 5,539,775; 5,500,650; 5,497,140; 5,479,416; 5,448,110; 5,365,551; 5,323,150 and 5,302,239, owned by Micron Technology, Inc. the disclosures of which are incorporated herein by reference.

Figure 4A:
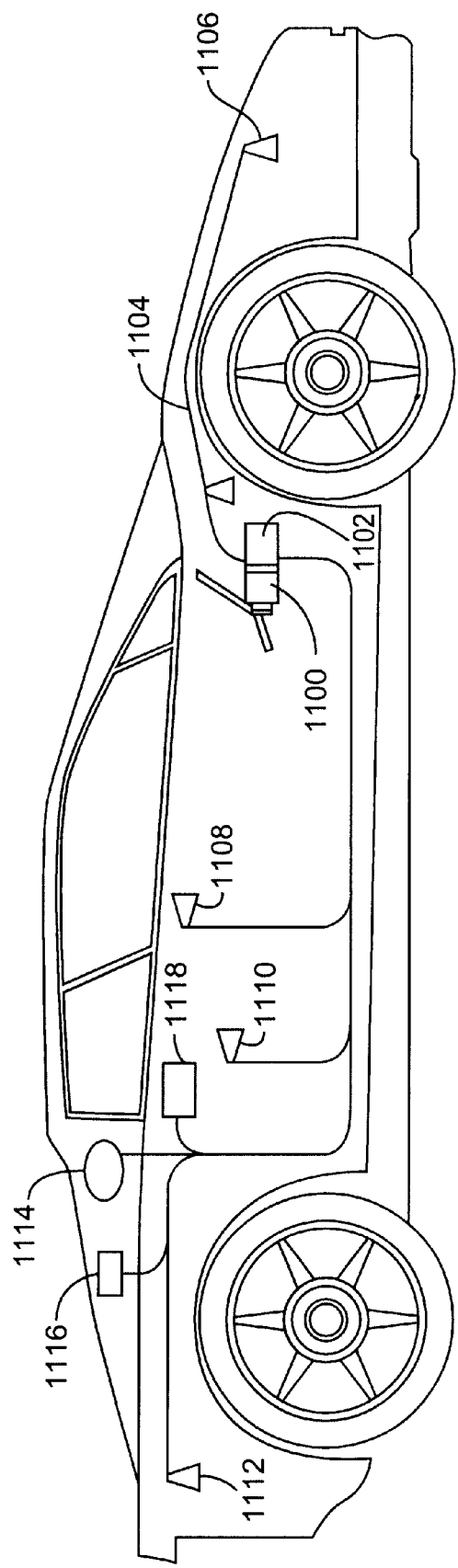
FIG. 4A is a schematic of an in-vehicle controller and associated peripheral devices on a vehicle constructed according to the present invention.

Referring now to FIG. 4A, a vehicle is shown equipped with an intelligent vehicle controller (IVC) 1100 providing interactive multimedia access for the driver and passengers of the vehicle. The intelligent vehicle controller 1100 is designed to provide vehicle occupants bidirectional access via various communication systems and networks to systems and people apart from the vehicle. The primary purpose of the IVC is to provide an interactive communication medium allowing customers to interface remote systems to 1) display menu information, 2) receive advertising, merchandising and possibly menu indicia and, in return, 3) order and provide payment for selected items from within the vehicle. The IVC may also facilitate monitoring, reconfiguration and transfer of various types of vehicle data, such as operational, diagnostic or emission information.

The IVC 1100 may be permanently integrated in the vehicle interior with vehicle's electronic system or be configured to removably interface with the vehicle and remain portable between vehicles. In a portable configuration, an interface or docking station 102 is preferable to couple the IVC 1100 to any necessary communication electronics and any desired vehicle systems.

The vehicle shown in FIG. 4A is equipped with an IVC 1100 coupled to a vehicle mounted docking interface 1102. The docking interface 1102 preferably is coupled via a bus or wiring network 1 104 to various vehicle systems and/or sensors 1106–1112. The IVC 1100 either directly or through the docking interface 1102 and/or the network 1104 will interface with any necessary communication electronics 1116 to provide communications to and from the vehicle. The necessary transmitter and receiver may be placed in the IVC 1100, the docking interface 1102 or a separate module coupled to the docking interface 1102 or the IVC 1100. Any necessary antennas are preferably placed near the vehicle's exterior to enable proper communications to and from the proper external system.

The IVC 1100 may also directly or indirectly cooperate with the vehicle's fueling system 1114, including any ORVR equipment as well as a central vehicle control system 1118. In embodiments where the IVC is integrated with the vehicle, the control and communication aspects of the vehicle and the IVC may be integrated into one centralized control system capable of operating a multimedia interface associated with the IVC, any communication electronics, and the remaining vehicle systems, sensors and functions.

Figure 4B:
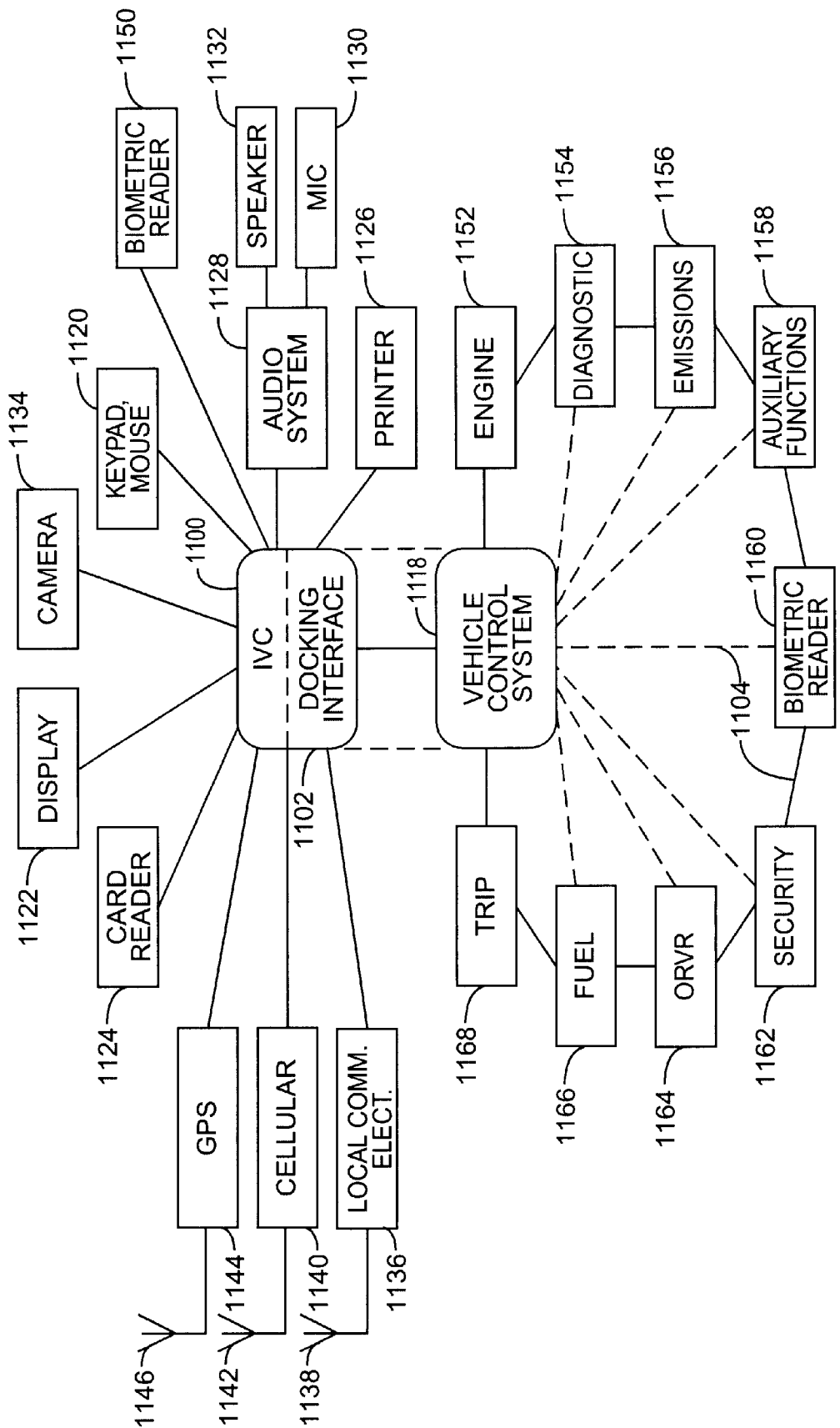
FIG. 4B is a schematic of an in-vehicle controller and associated peripheral devices constructed according to the present invention.

As shown in FIG. 4B, the IVC may interface or actually be a part of a vehicle control system 1118. Thus, the IVC may have separate processing capability or share processing capability with the central vehicle control system, depending on the amount of integration and the configuration of the IVC and vehicle. Although the IVC 1100 and the vehicle control system 1118 may be integrated, the preferred embodiment provides an IVC 1100 capable of operating substantially independently of, yet cooperating with, the vehicle control system 1118.

The IVC 1100 may include the docking interface 1102 for coupling to the vehicle control system 1118. The IVC may also be associated with a card reader, SmartCard receiver, or biometric reader 1124, a user input means, such as a keypad, mouse or touch screen electronics 1120, a video display 1122, a card reader 1124, and a printer 1126. These features cooperate to provide a basic multimedia interface and means for paying for items ordered through the IVC 1100. Additionally, the IVC may include or be associated with an audio system 1128, microphone 1130 and speaker 1132 for providing a bi-directional audio/video intercom with a corresponding remote system, such as a quick-serve restaurant.

A camera 1134 may be provided to receive images of the vehicle's occupants to enhance an audio intercom system with one or two direction video. With such a system, an order entry operator at a quick-serve restaurant and the vehicle occupant would be able to see and hear each other during order placement. For information providing like audio and video intercom interface at a dispenser, attention is drawn to U.S. application Ser. No. 08/659,304 filed Jun. 6, 1996, entitled Fuel Dispenser/Operator Intercom System and the continuation application filed Feb. 10, 1998, the disclosure of which is incorporated herein by reference.

A biometric reader 1150 may also be coupled to the IVC to provide additional authorization or identification means for vehicle occupants. The biometric reader 1150 may read the occupant's fingerprints, voice print, retinal scan or other biometric indicia to provide a substantially secure authorization. Such authorization or identification is preferably used in cooperation with financial information stored in the IVC or retrieved via the card reader 1124. Biometric templates corresponding to the authorized card holder or occupant may be stored on a card read by the card reader, in the IVC remote system or on a network for comparison with the actual biometric indicia provided by the biometric reader 1150.

Figure 4C:
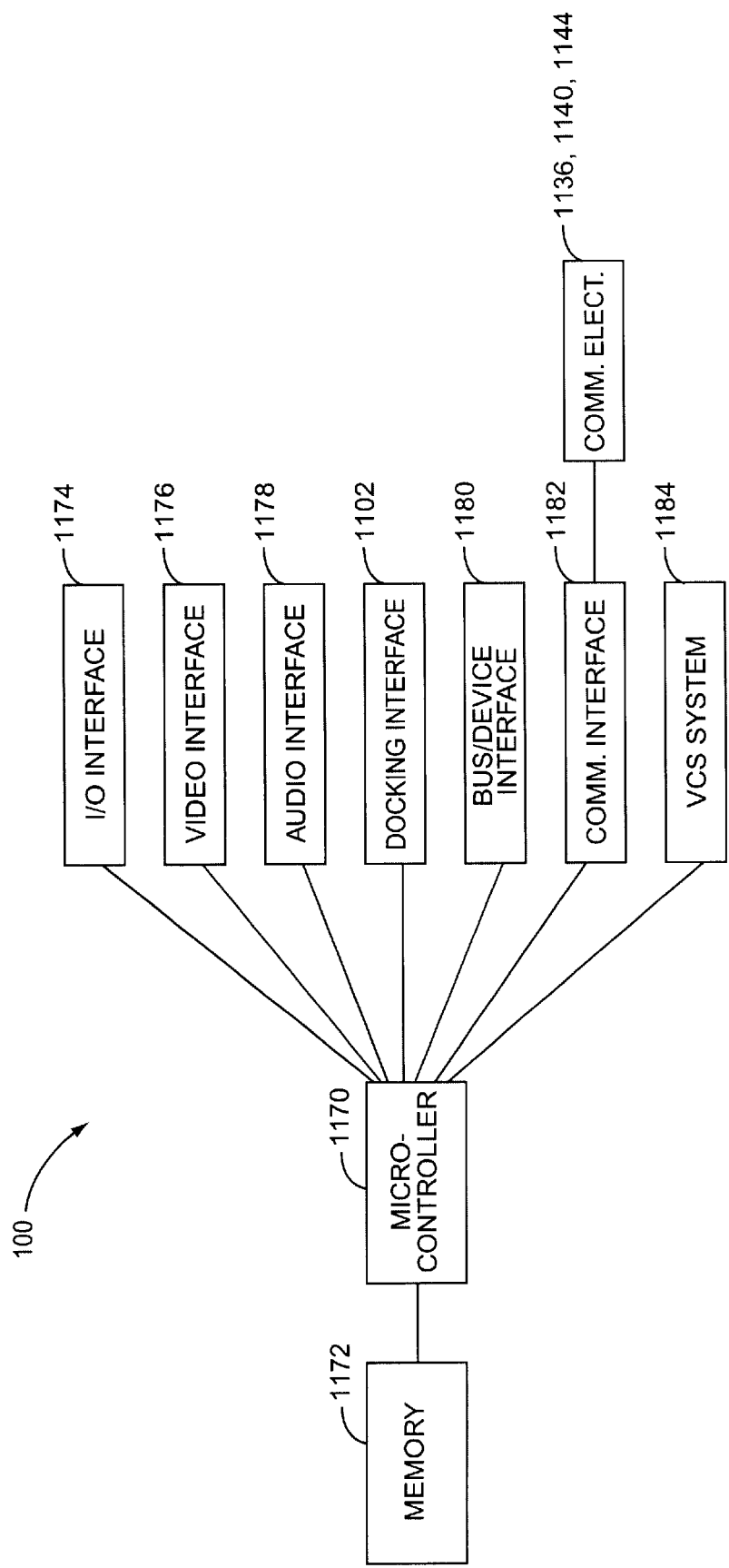
FIG. 4C is a more detailed block schematic of the in-vehicle controller constructed according to the present invention.
Figure 4D:
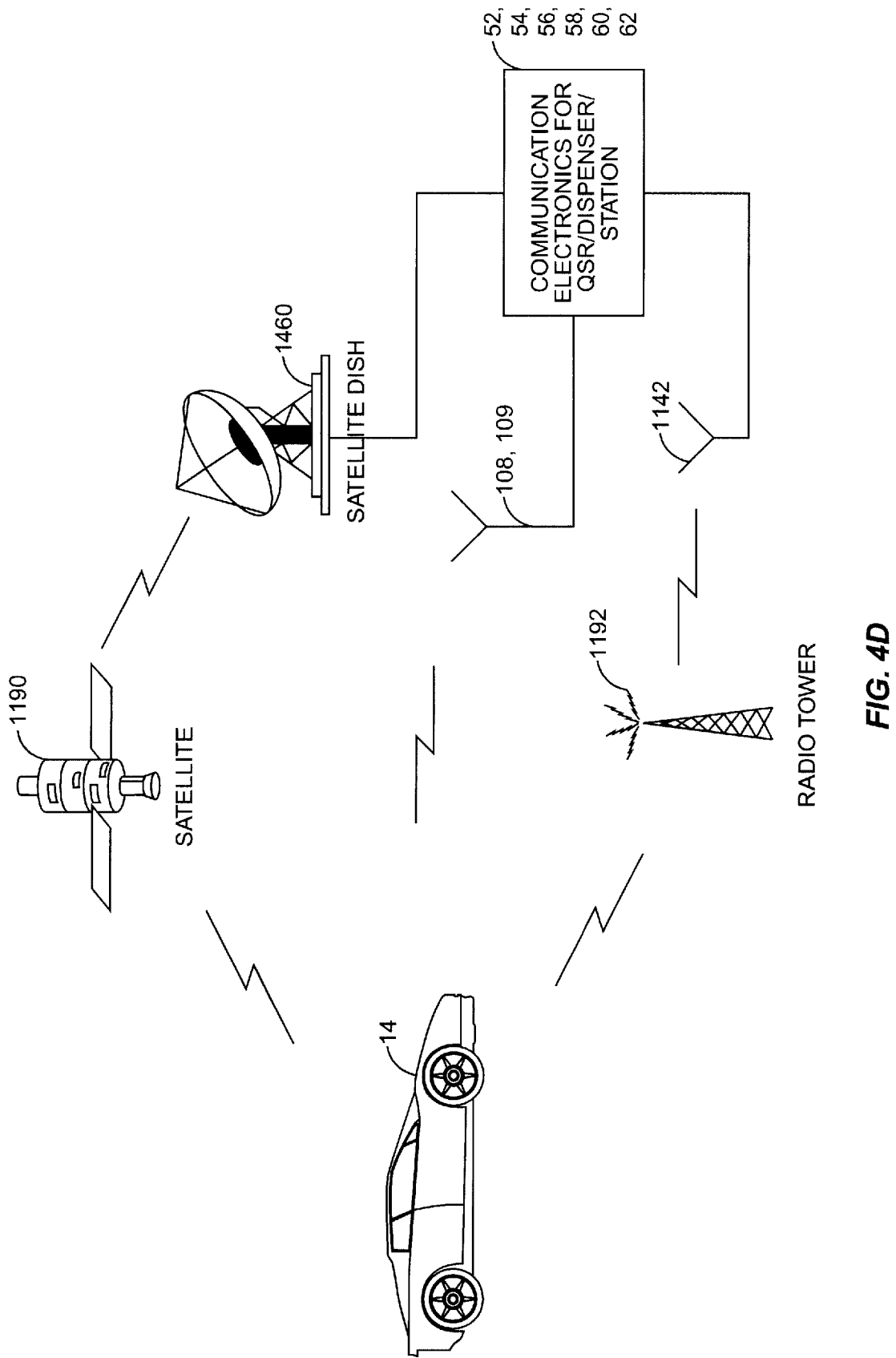
FIG. 4D is a schematic of the various communication systems available for use with the present invention.

In order to communicate with systems apart from the vehicle, one or more remote communication systems are required to facilitate bi-directional image and/or data transfer between a vehicle and a desired system directly or through any number of communication networks as shown in FIG. 4D. The IVC may be associated with satellite communication electronics 1144, such as that necessary to interact with the global positioning system, and an antenna 1146 for bi-directional satellite communications. In addition to determining vehicle location, a GPS or similar system may be used to provide to the vehicle operator directions and/or listings of stations capable of interacting with the IVC. Similarly, the IVC may be coupled to or include cellular communication electronics 1140 and the necessary antenna 1142 for communicating with the various analog or digital cellular systems. With the satellite and cellular communication electronics 1140 and 1144, bidirectional communications can be provided to virtually any point regardless of location and distance relative to the vehicle.

The preferred communication method provides more local communications with systems substantially proximate to the vehicle. The vehicle will be equipped with local communications electronics 1136 and the necessary antenna 1138 to provide bidirectional communications with any number of systems. These systems are not limited to, but are preferably energy dispensing systems, toll plazas, parking facilities, emissions and diagnostic systems, car washes, restaurants, fleet fueling, Intelligent Vehicle Highway Systems (IVHS), or emergency service providers.

It is also envisioned that the IVC be coupled to or integrated with a vehicle control system 1118 capable of controlling various engine functions 1152, diagnostic systems 1154, emission systems 1156, and any number of auxiliary functions 1158 or miscellaneous sensors 1160. The control system may also interact with the vehicle security system 1162, on-board vapor recovery equipment 1164, fuel status sensors 1166, and trip-related features and functions 1168. The IVC and/or vehicle control system 1118 will be able to monitor diagnostic or emission systems of the vehicle and communicate related information to the occupants of the vehicle and/or a remote system for further identification or processing of vehicles with diagnostic or emission problems or malfunctions.

For example, during a fueling operation at a fuel station, any diagnostic or emission problems may be forwarded through the local communication electronics to a corresponding interrogator or dispenser communication system and on to the proper authorities or the fuel station store. Providing such information to the fuel station provides a marketing opportunity for service equipped stations to address or correct any diagnostic or emission problems, as well as a system for endorsing government regulations. Similarly, security breaches, such as theft of the vehicle, may be reported in like manner.

With respect to fueling, information relating the amount of fuel, the size of the vehicle fuel tank and the type of the vehicle fuel tank may be transferred onto the fuel station store or fuel dispenser. This information may be used to control robotic or automatic fueling, and tailor a fueling operation to a particular vehicle in order to maximize delivery rates, fuel quality or octane levels. The fueling information may include quantity, ullage, quality or octane readings. For those vehicles equipped with on-board vapor recovery (ORVR) equipment, the status, type, efficiency and other related ORVR information may be communicated to the dispenser's vapor system in order to control vapor recovery at the dispenser and/or vehicle to maximize the vapor recovery effort while minimizing ingestion of non-hydrocarbon saturated air into the underground fuel tanks. For additional information relating to communications between the vehicle and a dispenser or dispensing system, attention is directed to U.S. Pat. application Ser. Nos. 08/650,917 filed May 17, 1996, entitled Precision Fuel Dispenser; 08/649,455 filed May 17, 1996, entitled Onboard Vapor Recovery Detection; 08/759,733 filed Dec. 6, 1996, entitled Intelligent Fueling; application entitled Transponder Communication of ORVR Presence (as yet unfiled); 09/034,969 filed Mar. 4, 1998, entitled Multistage Ordering System for a Fueling and Retail Environment; and 09/024,742 filed Feb. 17, 1998, entitled Fuel Dispensing System Providing Customer Preferences. The disclosures of these references are incorporated herein by reference.

With respect to FIG. 4C, the IVC preferably includes a microcontroller 1170 and associated memory 1172. The microcontroller and memory 1170, 1172 either include or are associated with various interfaces. These interfaces include multiple input/output interfaces 1174 for receiving and transmitting data to the various vehicle subsystems, and a video interface 1176 for receiving and transmitting video from the display 1122 and camera 1134. The docking interface 1102, as described, provides a coupling to the vehicle control system 1118 or bus or network system 1104. A network bus or device interface 1180 is provided to interface with a standard vehicle bus wherein various vehicle subsystems, including the vehicle control system 1118, are coupled to the same bus wherein each system is adapted to communicate with other systems as necessary to provide overall system functionality. The IVC also includes a communication interface 1182 as well as an optional direct vehicle control system interface 1184.

As those of ordinary skill in the art will recognize, there are a number of hardware configurations capable of providing the functionality described in association with the intelligent vehicle controller. The IVC provides an integrated or portable user interface for vehicle occupants to communicate with systems remote to the vehicle. The IVC provides full function audio, video and graphics, as well as means to receive occupant input, transactional information and vehicle identification. The IVC and other vehicle systems are configured to provide information transfer relating to both the vehicle and occupants while providing a secure, merchandising and order entry system within the vehicle.

Figure 5:
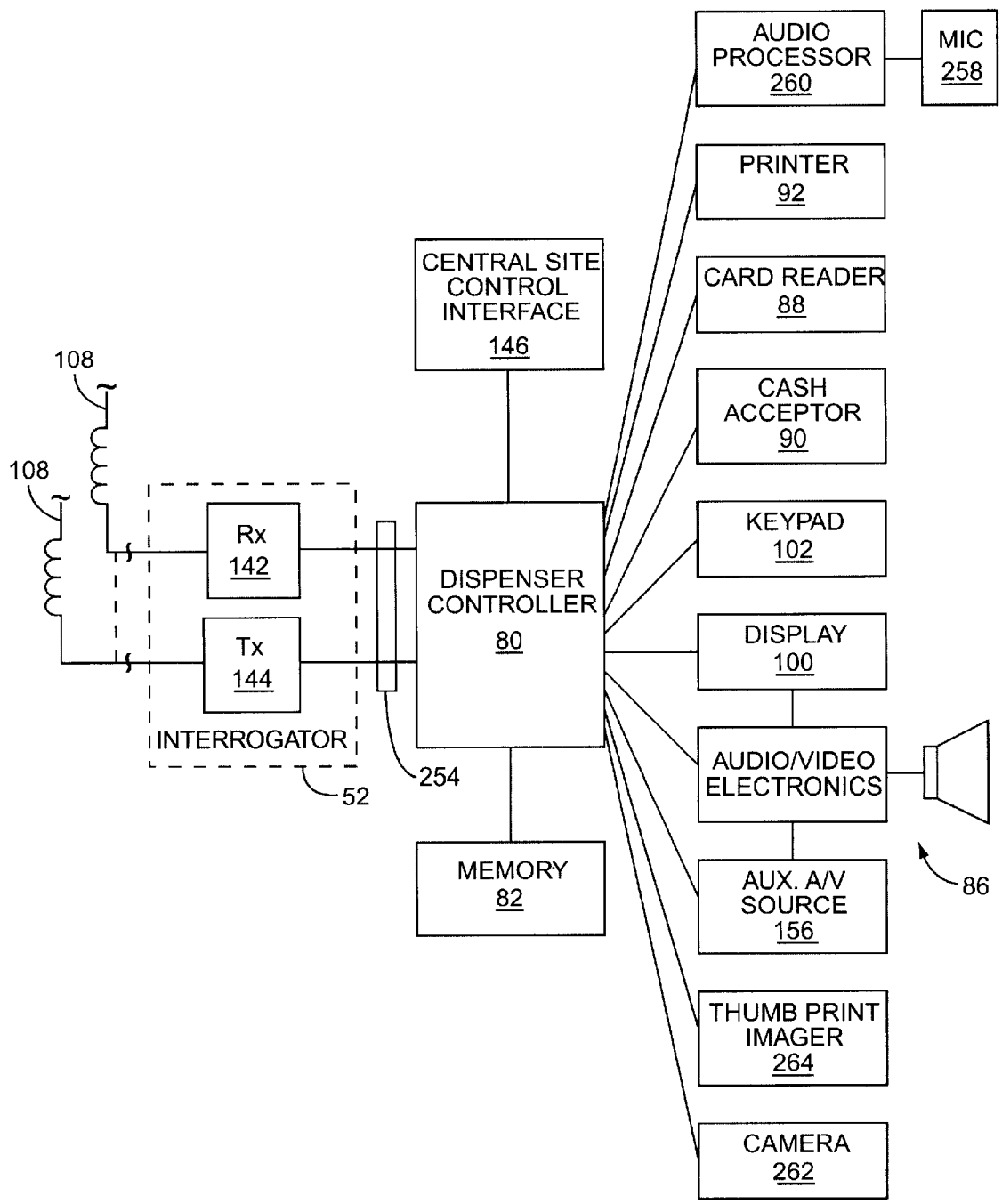
FIG. 5 is a schematic representation of fuel dispenser electronics constructed according to the present invention.

FIG. 5 shows a basic schematic overview of the dispenser electronics wherein a dispenser control system 80 includes a controller associated with the memory 82 to interface with the central control system 50 through an interface 146. The dispenser control system 80 provides a graphical user interface with key pad 102 and display 100. Audio/video electronics 86 is adapted to interface with the dispenser control system 80 and/or an auxiliary audio/video source 156 to provide advertising, merchandising and multimedia presentations to a customer in addition to basic transaction functions. The graphical user interface provided by the dispenser also allows customers to purchase goods and services other than fuel at the dispenser. The customer may also purchase a car wash and/or order food from the QSR while fueling the vehicle. The customer may be provided a video menu at the display 100 to facilitate selection of the various services, goods and food available for purchase. The card reader 88 and cash acceptor 90 allow the customer to pay for any of the services, goods or food ordered at the dispenser while the printer 92 will provide a written record of the transaction. However, the thrust of the present invention is to eliminate the need for customers to order at the dispenser and provide these functions from within the vehicle. The dispenser control system 80 is operatively associated with a dispenser interrogator 52, which has a receiver 142 and a transmitter 144. The receiver and transmitter typically associate with one or more antennas 108 to provide remote communications with the vehicle. The dispenser control system 80 communicates with the central control system 50 in the backroom 26.

Figure 6:
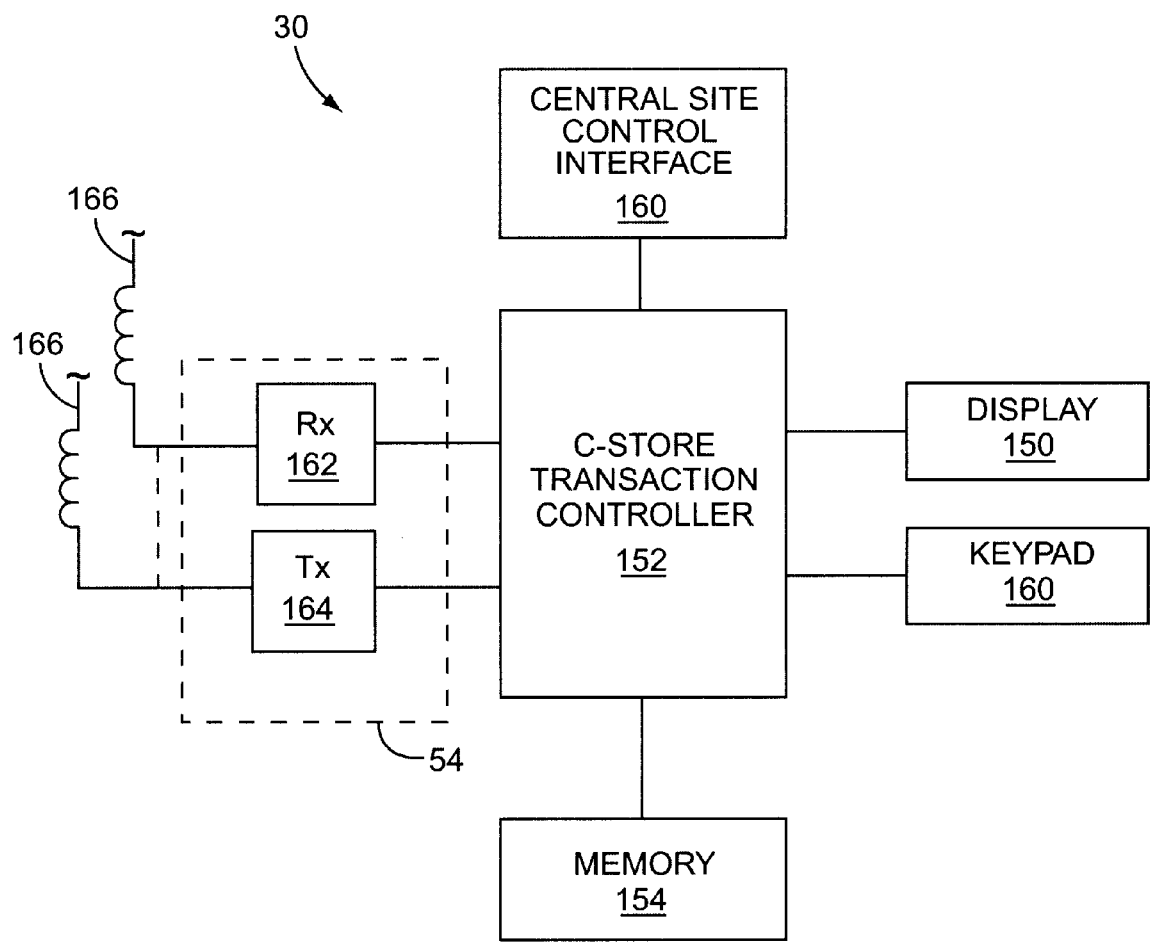
FIG. 6 is a schematic representation of convenience store transaction electronics, including a transaction terminal, for a fueling environment constructed according to the present invention.

In like fashion, the convenience store transaction electronics shown in FIG. 6, and more specifically the transaction terminal register 30, include a store transaction controller 152, associated memory 154, the interrogator 54, and a display and key pad 150, 160 forming a transaction terminal interface. The transaction controller 152 interacts with the central control system 50 through the central site control interface 160. The interrogator 54 includes a receiver 162 and a transmitter 164, both of which are associated with one or more antennas 166. The transaction terminal 30 is adapted to provide typical transaction functions of a cash register and a card authorization terminal in addition to communicating with transponders within the store and/or proximate to the terminal. The communications between the transponder and the store transaction terminal are generally related to transactional and customer identification and monitoring, although other features will become apparent to those skilled in the art upon reading this disclosure.

Figure 7:
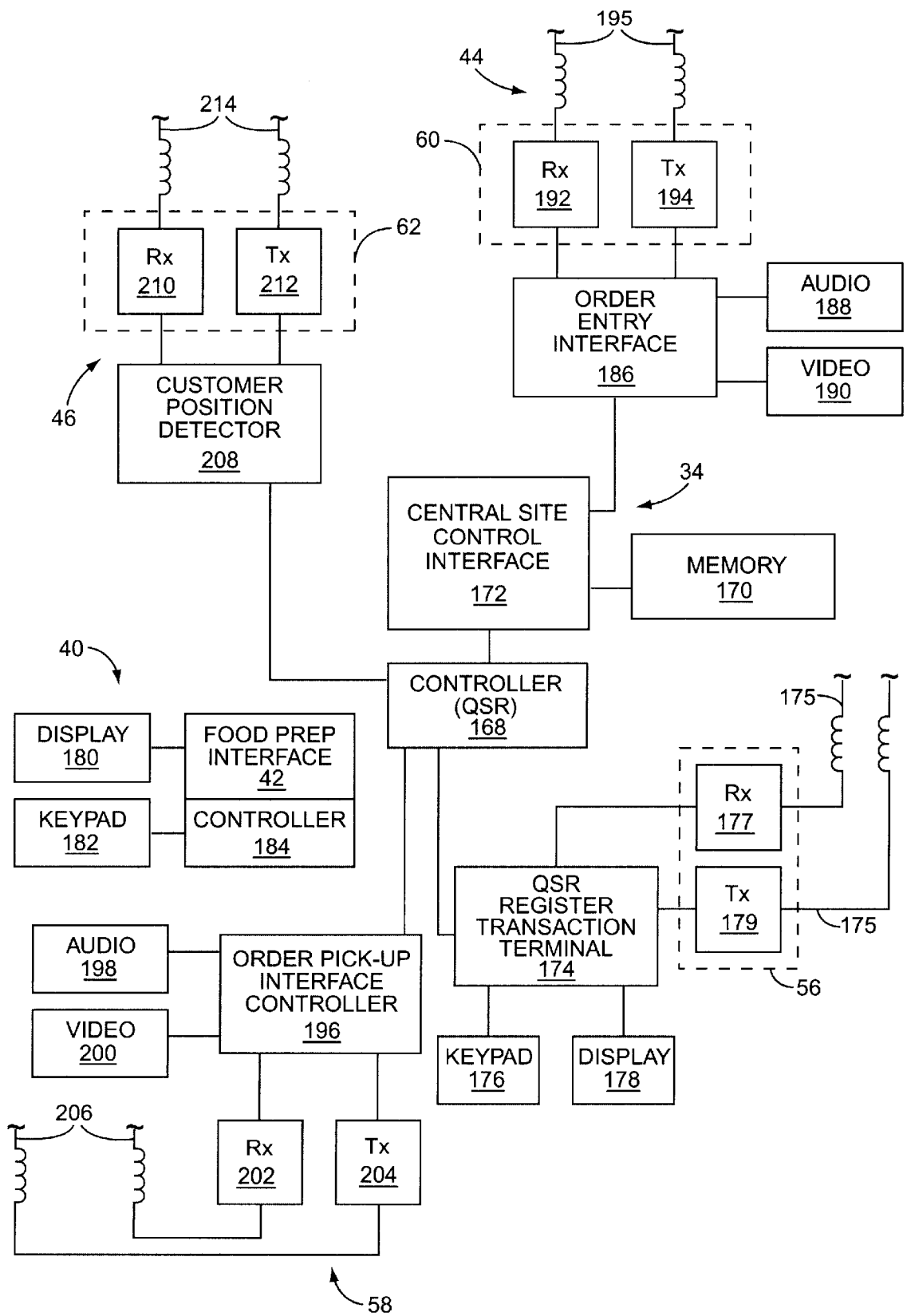
FIG. 7 is a schematic representation of a quick-serve restaurant control system for a fueling environment constructed according to the present invention.

Attention is now drawn to FIG. 7 and the schematic outline of the QSR electronics shown therein. The QSR will generally have a controller 168 and associated memory 170 capable of interfacing with the central control system 50 through a central site control interface 172. As with many QSR's, a transaction terminal or register 174 is provided having a key pad 176 and display 178. The QSR transaction terminal 174 is used by a QSR operator to take customer orders from within the store in conventional fashion. The orders are either verbally or electronically communicated to the food preparation area 40 through the QSR controller 168. The QSR transaction terminal 174 is associated with interrogator 56 having a receiver 177 and a transmitter 179 associated with one or more antennas 175. The food preparation area will typically have a food preparation interface 42 having a display 180 and a key pad 182. The food preparation interface 42 may be a terminal run from the QSR controller 168 or may contain a food preparation controller 184 within the food preparation interface 42. However the system is arranged, order information is passed from one of the order interfaces to the food preparation display 180 to alert food preparers of an order.

In a QSR embodiment providing drive-thru capability, a remote order entry interface 186 is provided. The order entry interface 186 may include a simple menu board and audio intercom system 188, or in a more sophisticated embodiment, may provide for bi-directional video intercom using the audio intercom 188 and a video system 190 allowing the customer and QSR operator to audibly and visually interact with one another during order placement. The order entry interface 186 may also include an interrogator 60 having a receiver 192 and a transmitter 194, associated with one or more antennas 195, for communicating with a transponder of a customer when the customer is placing an order from within the vehicle or at the order entry interface 186.

Typically, orders placed at the order entry interface 186 are sent to the order pickup interface 196, which is normally situated proximate to the pick-up window 36 at the end of the drive-thru lane. The order pick-up interface 196 will have an audio system 198 to provide the audio intercom and an optional video system 200 if video intercom with the order entry interface 186 is desired. The order pick-up interface 196 also has an associated interrogator 58 having a receiver 202 and a transmitter 204 associated with one or more antennas 206.

Unlike existing QSR's, the present invention may include a customer position detector 208, preferably placed somewhere along the drive-thru lane to detect when a customer is at or is past that position en route to pick up an order, which may have been placed at a fuel dispenser 18. The customer position detector 208 is associated with the drive-thru position interrogator 62 and includes a receiver 210 and a transmitter 212 associated with one or more antennas 214.

Figure 8:
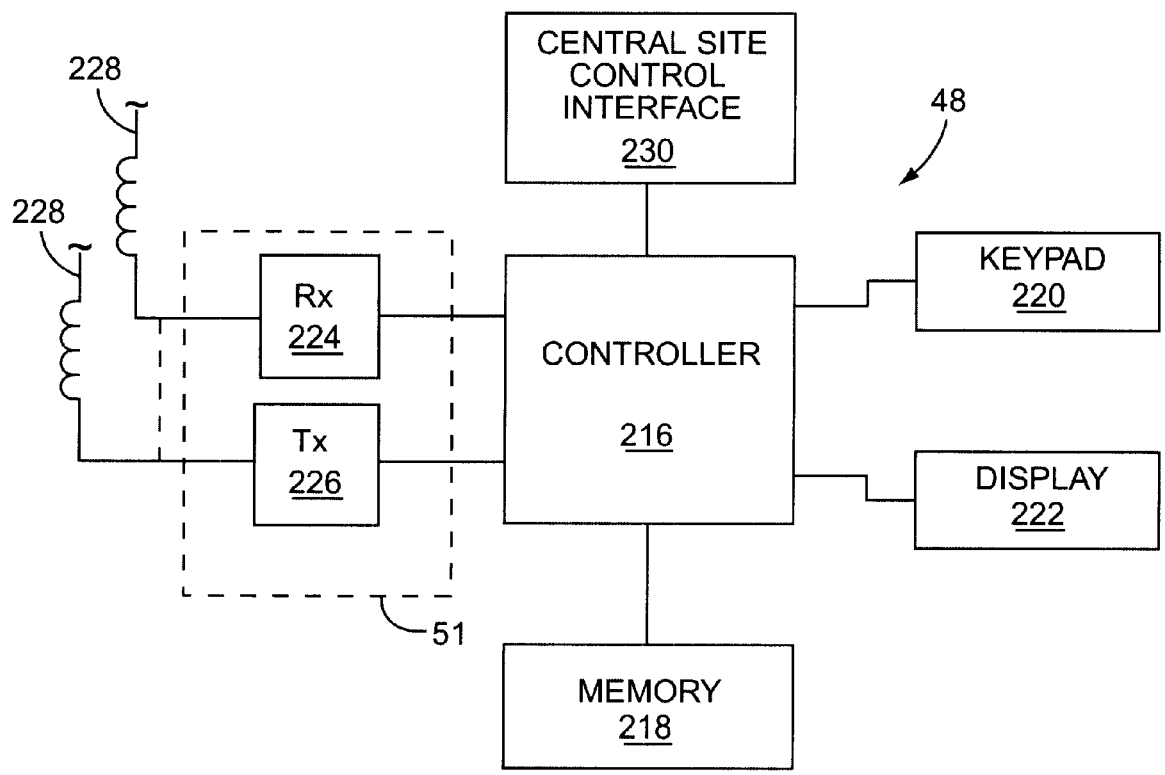
FIG. 8 is a schematic representation of a car wash control system constructed according to the present invention.

FIG. 8 depicts the basic outline of the car wash electronics, which includes a controller 216, memory 218, a key pad 220, a display 222 and the interrogator 51. The key pad 220 and display 222 combine with the controller 216 to provide a customer interface 48. The interrogator 51 includes a receiver 224 and a transmitter 226 associated with one or more antennas 228. Additionally, the car wash controller 216 preferably communicates with the central control system 50 in the store via a central site control interface 230. The interrogator 51 will typically communicate with the IVC to automatically authorize a car wash previously paid for at the dispenser or inside the store. The key pad may be used to insert a secret code or other information to select a type of wash or otherwise authorize the car wash.

Figure 9:
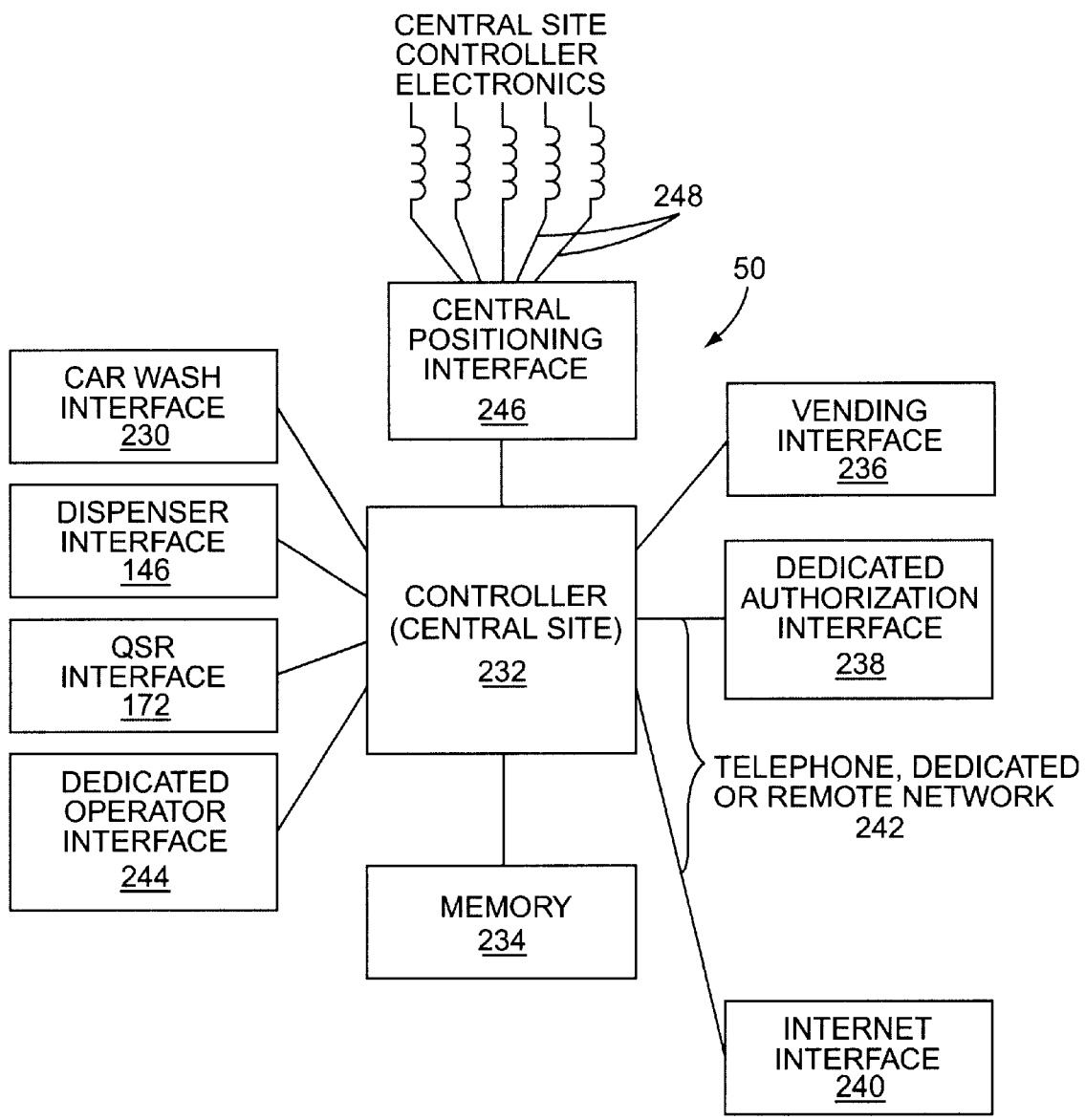
FIG. 9 is a schematic representation of a central control system for a fueling environment constructed according to the present invention.

FIG. 9 generally depicts the central control system 50 found in the backroom 26 of the fueling environment 10. The central control system 50 may include one or more controllers 232 associated with memory 234. The central control system 50 may include multiple interfaces with the various areas in the fueling environment 10. These interfaces include the car wash interface 230, dispenser interface 146, QSR interface 172 and the vending interface 236 connected to an automated vending machine 28. Additionally, the central controller 232 may have a dedicated network or authorization interface 238 connected to a host transaction network 94 for authorizing credit and debit transactions and the like. An Internet interface may also be provided for transactions and other information relating to operation, advertising, merchandising and general inventory and management functions.

The dedicated authorization interface and/or Internet interface may operate on a dedicated service line or a telephone system 242. Furthermore, the central control system 50 may have a direct operator interface 244 associated with the controller 232 to allow an operator to interact with the control system. In more advanced embodiments, a central positioning interface 246 associated with multiple antennas 248 may be used to determine transponder position and location throughout the fueling environment. Those skilled in the art will be aware of a multitude of positioning and locating techniques, such as triangulation, wherein various characteristics of a signal emitted from the transponder are measured and monitored to determine movement as well as precise location. The antennas 248 associated with the central positioning interface 246 may take the place of or act in conjunction with the various antennas throughout the fueling environment to locate and monitor movement of the transponders in the fueling environment. Attention is drawn to application Ser. No. 08/966,237 entitled TRANSPONDER DISTINCTION IN A FUELING ENVIRONMENT filed Nov. 7, 1997, in the name of William S. Johnson, Jr. and application Ser. No. 08/759,733 filed Dec. 6, 1996, entitled INTELLIGENT FUELING in the name of Hartsell, et al. The entire disclosure of these two patent applications is incorporated herein by reference.

Multistage Ordering

One of the many unique aspects of the present invention is providing for monitoring customer position throughout the fueling environment in order to associate orders placed from the IVC or at the fuel dispenser with the particular customer that placed the order at the appropriate receiving point, such as the QSR drive-thru terminal and window 36, QSR transaction terminal 34 in the store, or, in the case of a car wash, at the car wash interface 48. In addition to associating the customer picking up the order with the appropriate order, the QSR can monitor or detect the position of the customer in the drive-thru line or elsewhere in the fueling environment to determine when to start order preparation.

For example, before or during the fueling operation, the customer may decide to order a few items from a menu displayed on the IVC or at the dispenser 18. As the customer enters the order, the order is associated with the customer or the customer's vehicle. The customer may choose to pay for the order along with the fuel at the dispenser via the IVC using stored account information, at the order pick-up place at the drive-thru window, or at one of the in-store registers associated with the QSR or the convenience store. Continuing with our example and assuming the transaction was paid for from the IVC, the customer will ultimately drive the vehicle around the fuel station store along the drive-thru lane and pass the customer position monitor 46. As the customer approaches the customer position monitor 46, the drive-thru position interrogator 62 will receive a signal from the vehicle indicating the customer is at a known position in the drive-thru lane. At this point, the QSR control system 168 will alert the food preparation area 40 to prepare the order and indicate to the order pick-up interface and controller 196 the position of the customer in the drive-thru lane. Once the customer reaches the order pick-up window, the order pick-up interrogator will determine the presence of the vehicle and associate the customer's order accordingly so that the drive-thru window operator can deliver the freshly prepared order to the correct customer. Associating the customer with the appropriate order in a fueling environment having a QSR is quite different from traditional QSR drive-thru systems. With QSR's in a fueling environment, orders for pick up at the drive-thru window, or within the store for that matter, may be placed in a different sequence than the sequence in which the orders are actually picked up. The reason for the possible discrepancy between order placement and order pick up arises because orders can be placed at several locations, including the IVC, the fuel dispenser and the traditional order entry interface 44. In particular, those customers placing orders at the dispenser or IVC will most likely intermingle in the drive-thru line with those placing orders at the order entry interface 44. The present invention uses transponders to appropriately associate orders placed at different locations with the appropriate customer at a common pick-up location.

Figure 10A:
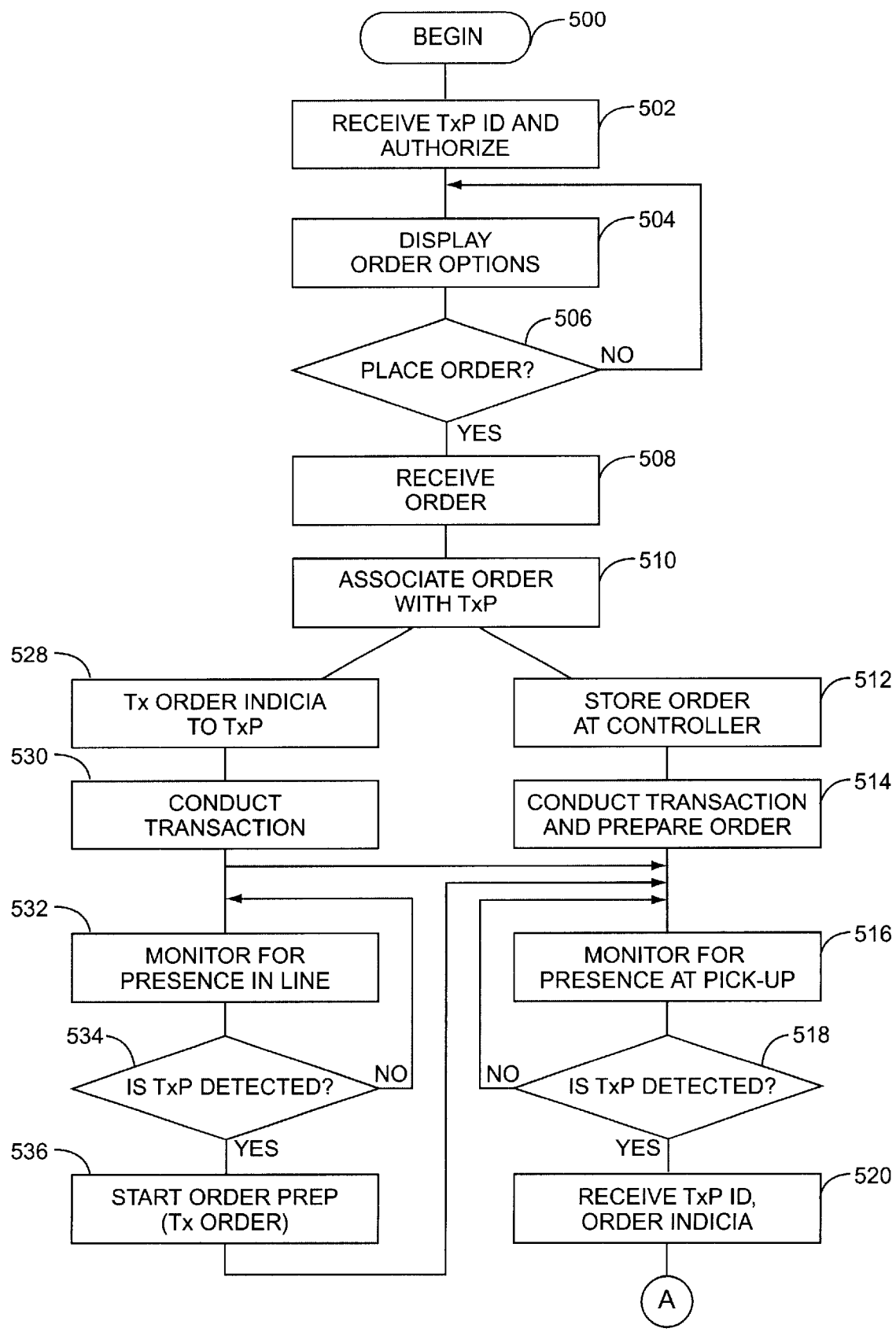
FIGS. 10A and 10B are a flow chart representing a basic flow of a multistage ordering process according to the present invention.
Figure 10B:
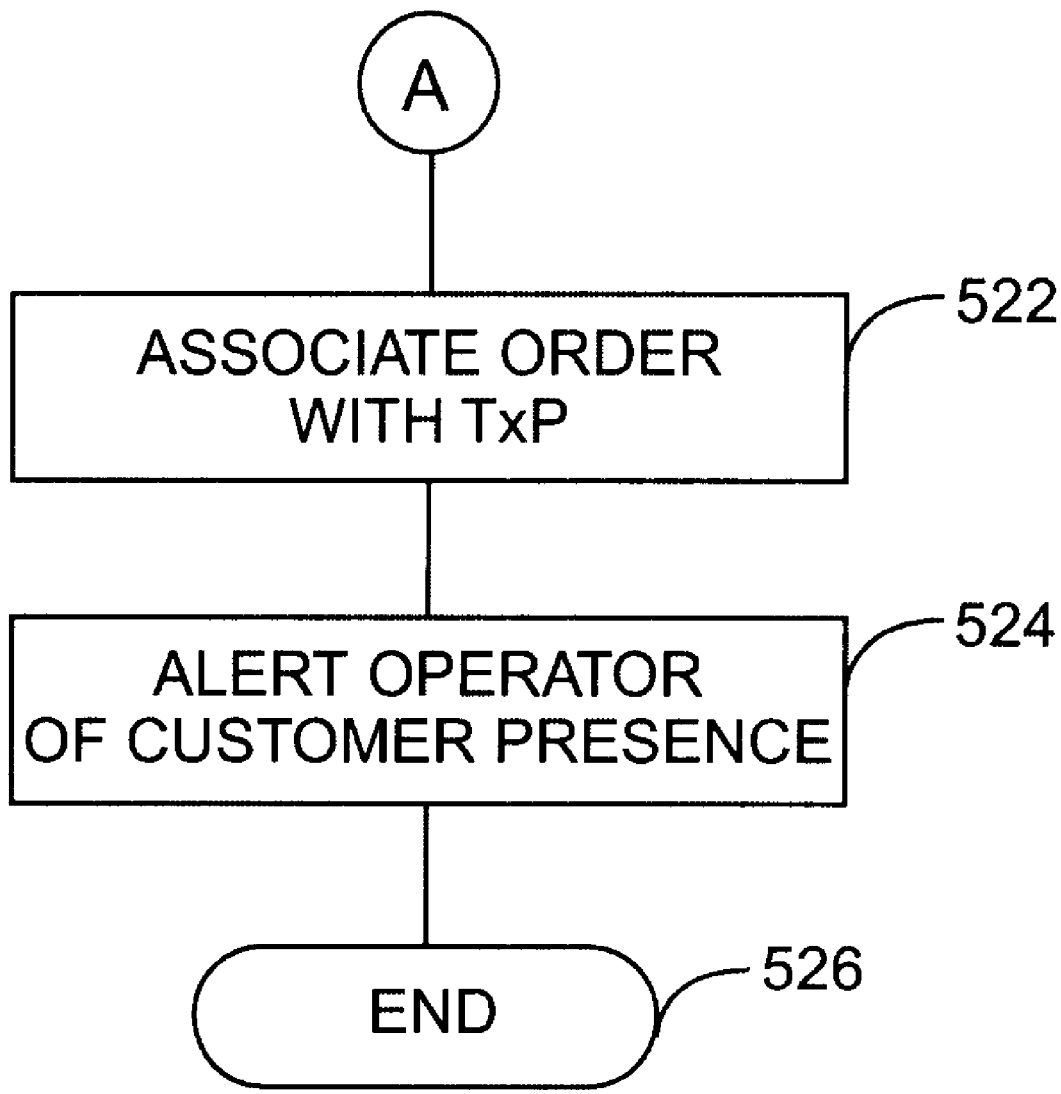

With this in mind, attention is drawn to the flow chart of FIGS. 10A and 10B representing the basic flow of various multistage ordering processes. The process begins (block 500) when the dispenser interrogator 52 receives a signal from a transponder and the dispenser control system 80 forwards transponder identification indicia (ID) to the central control system 50 for authorization (block 502). Information relating to whether or not an order was placed in the vehicle may also be transmitted. Authorization may occur locally at the central site controller 232 or at a remote host authorization network. The information to be authorized is generally financial or account information and can either be transmitted with the transponder ID or stored at the central control system 50 or the host network 94 in association with the transponder ID. In the latter case, either the host network 94 or the central control system 50 will associate the ID with the stored account information and then authorize the transponder based on the correlated account information. Preferably, the transponder is read and authorized as the customer and/or vehicle approaches or initially stops at the fueling position and preferably, at least, before a transaction is initiated to increase transaction efficiency.

As the customer fuels the vehicle, the dispenser may display various types of information including advertising and instructional information. Preferably, before or during fueling, the IVC will display options for ordering food items from the QSR or ordering a car wash at the car wash 24 (block 504) in addition to various messages, advertising and instructional information received from the dispenser or QSR. The menu information may be stored in IVC memory or it may be updated or completely downloaded to the IVC by transmitting the necessary information to the IVC before or during the fueling operation. The dispenser 18 may determine whether an order has been placed (block 506) based on signals transmitted from the IVC. The dispenser 18 will receive any orders placed by the customer via the IVC (block 508) and associate the order with the vehicle customer in some fashion (block 510), if the order is not automatically associated at the IVC before being transmitted. Typically, the order is associated with a transponder by (1) associating the order with the vehicle, (2) associating a code with the order, or (3) actually storing the order at the IVC. Those of ordinary skill in the art will recognize that there are many variations available for associating an order with a vehicle or customer. These variations are considered within the scope of this disclosure and the claims that follow.

Although there are various options, two general methods for associating an order with a transponder will be discussed below. With the first, no information for order association is transmitted to the transponder relating to the order. Instead, the electronics at the dispenser 18, central control system 50 or the QSR 22 stores the order information and associates the order with the transponder ID. When one of the interrogators subsequently reads the vehicle or transponder ID, the pertinent system will correlate the order with the vehicle. The second method involves writing information to the vehicle through the dispenser 18 and subsequently transmitting that information to one of the system interrogators for authorization or order identification. The information written to the transponder may range from a code for identification authorization purposes to the complete order placed at the dispenser.

Returning to FIG. 10A, the basic flow of both of the above-discussed methods are shown. In cases where one of the control systems associates an order based on the transponder ID, the customer order is transferred to the QSR controller 108 through the central control system 50 (block 512). The dispenser 18 will effect payment for the transaction (typically adding the QSR purchase total to the fueling charge) and the QSR controller 168 will alert the food preparation area to prepare the order (block 514).

In a basic environment, the QSR order pick-up interface 198 will monitor for the presence of a transponder through the drive-thru pick-up interrogator 58 or the in-store QSR transaction terminal interrogator 56 (block 516). If a transponder is not detected, the systems continue to monitor for a transponder (block 518). Once a transponder is detected, the transponder ID is received (block 520) and the transponder ID is associated with the appropriate order (block 522). At this point, the QSR operator located at the pick-up window or the in-store transaction terminal is informed of the order corresponding to the customer at the window or terminal (block 524) and the fueling and retail transaction for that particular customer ends (block 526).

Alternatively, once a customer places an order and the dispenser 18 receives the order (block 508), and the order is associated with the transponder (block 510), the dispenser 18 may transmit order indicia, such as a code for the order itself, to the transponder for storage (block 528). Next, the dispenser 18 will effect payment for the transaction as discussed above (block 530). In the more basic embodiment discussed above, the QSR interrogators associated with the QSR window or in-store terminal will monitor for the presence of a transponder (block 516 and 518), receive the transponder order indicia (block 518), and associate the order with the indicia received from the transponder (block 522). The operator is then informed of the order for that particular customer (block 524).

In any of the above embodiments, the customer position detector 46 may be used to alert QSR operators of the approach and location in the drive-thru line of a particular customer. For the sake of clarity, the process of FIG. 10A only depicts using the customer position detector 46 in a process where order indicia is transmitted to the transponder. Please note that using the customer position detector 46 may be used in any of the embodiments, as those of ordinary skill in the art will appreciate.

Once the order is placed, received and associated with the transponder in normal fashion (blocks 500–510), indicia of the order is transmitted to the transponder (block 528) and the transaction is effected (block 530) in normal fashion. At this point, the customer position detector 46 will monitor for the presence of a transponder via the interrogator 62 (blocks 532 and 534). Once a transponder is detected, the customer position detector 46 will forward the transponder indicia to the food preparation area 40 through the QSR controller 108. This allows for the food preparation operators to timely prepare a customer order based on the customer's approach to the pick-up window (block 536). This information may also be sent to the pick-up operator to indicate customer position. The customer will proceed along the drive-thru lane until the pick-up window is approached where the transponder is detected by the order pick-up interrogator 58 (blocks 516 and 518). The transponder ID or indicia is received by the QSR electronics, and the operator is informed of the order corresponding to the customer at the window (blocks 522–526).

Although there are numerous variations to multistage ordering, the important aspects of the invention are associating a transponder with an order placed by a customer at the fuel dispenser and subsequently using information from the transponder to reassociate the order with that particular transponder. Order association may be automatic when the IVC is configured to send transponder or vehicle identification indicia with the order. Optionally, an additional interrogation stage may provide a further alert to a QSR operator of the approach of a customer to initiate food preparation or simply indicate the position of the customer in line.

The multistage ordering works equally well with QSR's and car wash systems. When a car wash is ordered from the IVC and sent to the dispenser (or any other communication electronics), the particular car wash ordered is associated with the transponder at the dispenser and subsequently reassociated when the customer approaches the car wash area 24 and is interrogated by the car wash interrogator 51. In the preferred embodiment, the dispenser operates in conjunction with the central control system 50 to provide authorization of the car wash purchased at the dispenser. When the customer is at the car wash 24, the vehicle is interrogated for an ID or a code, which the car wash controller and/or the central control system 50 recognizes as preauthorized. If additional security is necessary on any of these embodiments, the customer may receive a code or other indicia, such as a PIN, which they are required to enter or submit when the corresponding goods or services are received.

Importantly, the fuel dispenser 18 is not the only point of communications for an IVC where ordering may take place. A customer may, for instance, order a car wash in conjunction with placing an order for food or other merchandise. The interrogators at any terminal can as easily associate the car wash with the vehicle and operate through the central control system 50 to subsequently reassociate the vehicle and the ordered car wash at the car wash interface 48. The multistage ordering disclosed herein provides a solution for keeping track of various transactions in a fueling environment where customer orders are picked up in locations separate from where they are placed and very likely may not be picked up in the order they were placed.

IVC Ordering

Figure 11A:
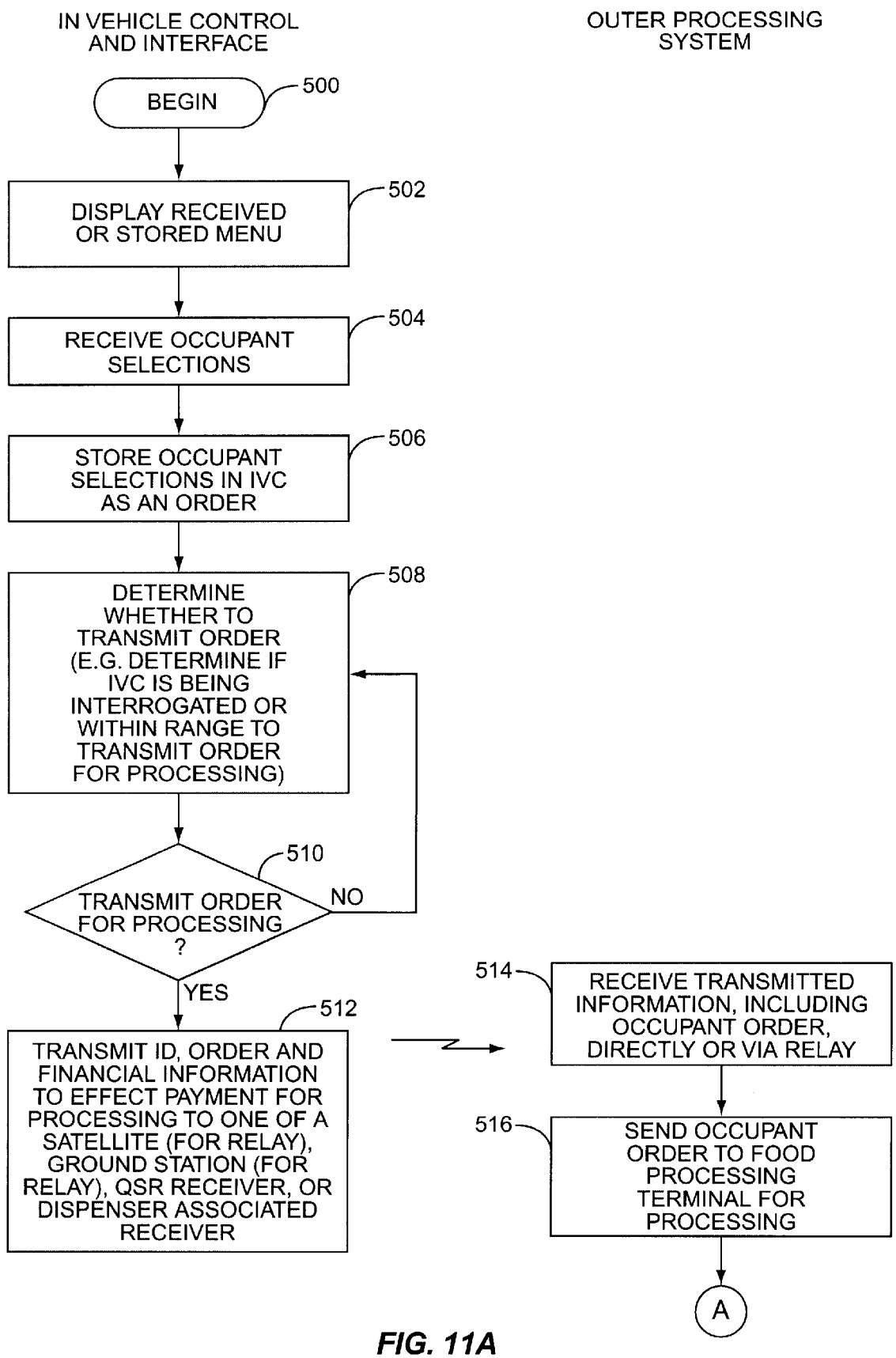
FIGS. 11A, 11B, and 11C are a flow chart outlining the basic operation of the present invention.
Figure 11B:
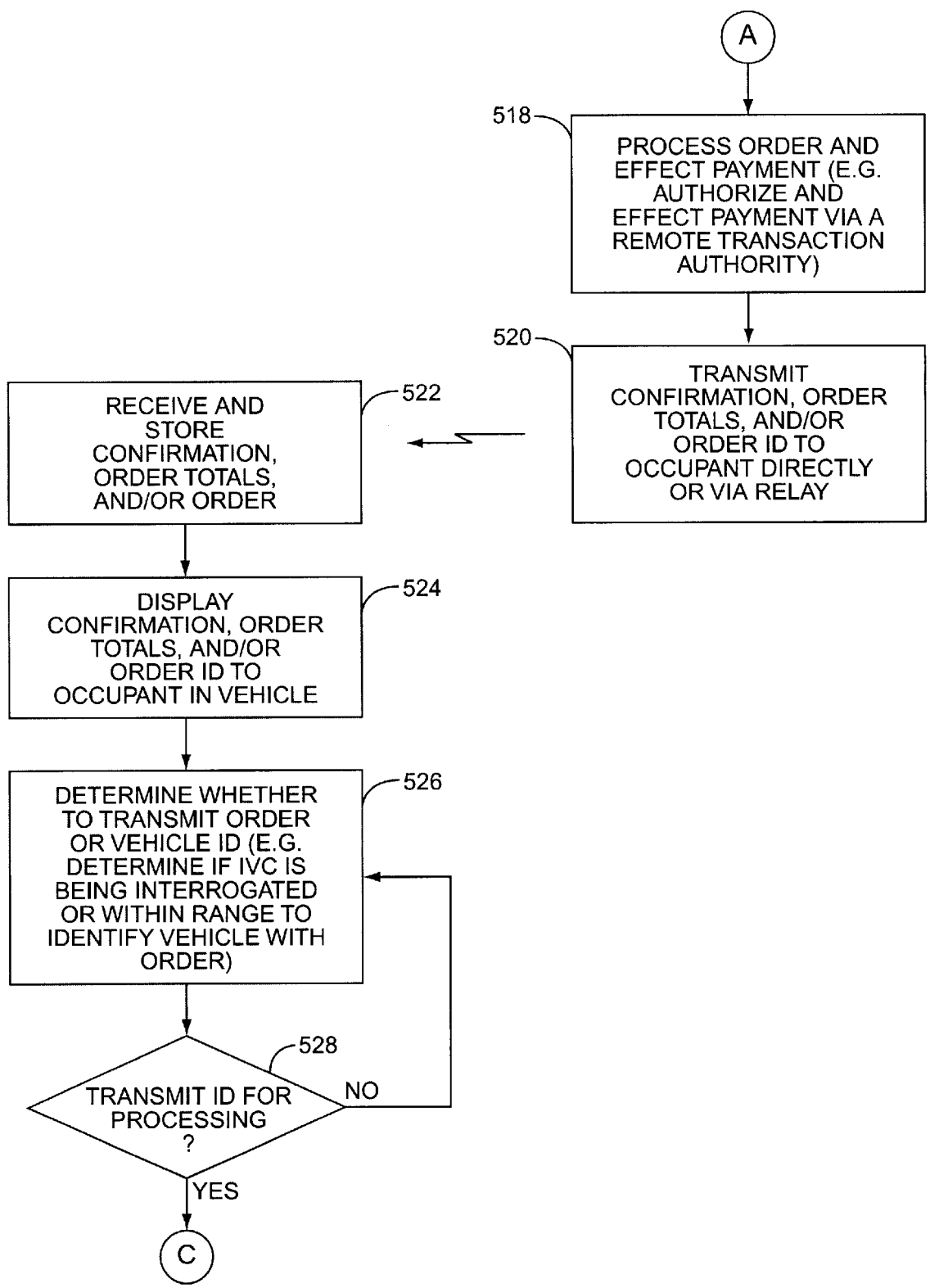
Figure 11C:
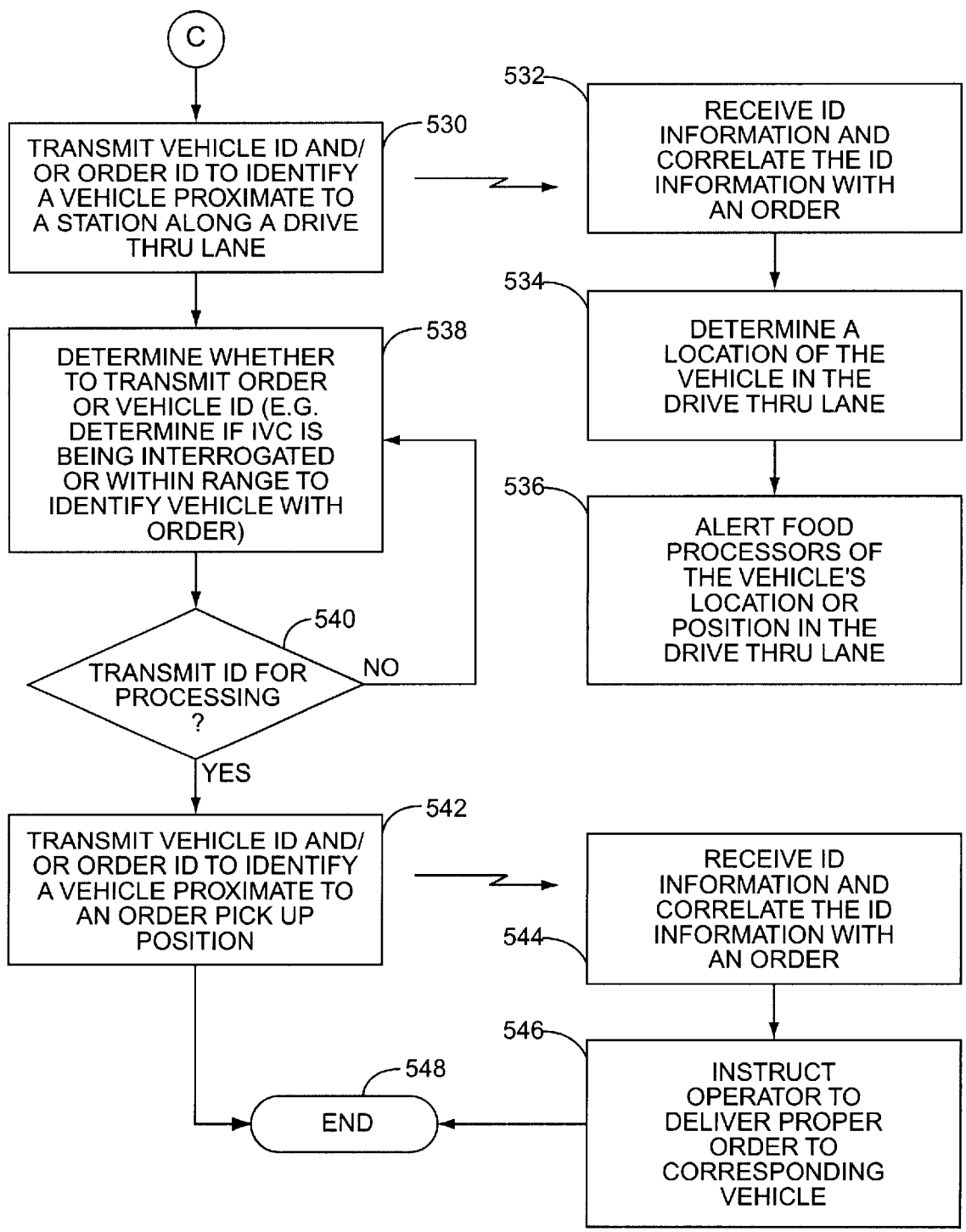

In operation, the IVC is configured to 1) provide pre-stored or downloaded information, such as menu information, to the occupants of the vehicle, 2) receive order entries from one or more of the occupants, and 3) effect transfer of the occupant order to the necessary communication electronics associated in some manner with the QSR to effect order processing. With reference to FIGS. 11A–11C, a basic order entry, monitoring, and receipt process is described. The process begins (block 500) wherein the IVC displays downloaded or pre-stored menu selections on display 122. The menu information may be transmitted to the vehicle prior to arriving at the fuel station or QSR, as well as at any point throughout the fueling environment, including a fueling position. Preferably, the menu information is either pre-stored or downloaded once the vehicle comes within a communication range of any dispenser or QSR communication electronics. At that point, the menu may be stored for future reference and/or an order may be entered prior to reaching the fuel station. For example, a menu stored at an earlier location may allow occupants to place their order wherein any price changes would be updated by downloading pricing information from the fuel dispenser. The menu information may be transmitted directly to the vehicle from fuel dispenser or QSR associated communication electronics, as well as indirectly via ground-based satellite communications.

Once the occupant views the menu, the IVC will receive occupant selections (block 504) and store these selections in the IVC as an order (block 506). Depending on the location of the vehicle and whether or not the vehicle is within communication range with the corresponding communication electronics (dispenser, QSR, satellite, cellular or other), the information may be automatically transmitted or transmitted upon receiving an occupant input to that effect. With more direct communications, the IVC may wait until it is interrogated or receives a signal indicating that the IVC is within range (block 508).

At this point, the IVC will determine whether or not to transmit the order for processing (block 510). If the order is not ready to be transmitted for processing, the IVC will again determine whether to transmit the order (block 508). If the order is ready to be transmitted for processing, the IVC may transmit identification indicia, the occupant order, and/or financial information to effect payment for processing (block 512). The financial information may be stored in the IVC or read from various types of cards via the IVC card reader 1124.

Once the identification indicia, order and financial information are transmitted, it is ultimately received by communication electronics associated with the QSR's order processing system (block 514). As noted, the information may be directly or indirectly transmitted via any type of ground-based or satellite communication network. Furthermore, information may be received at a fuel dispenser, near a fuel dispenser, or directly by the quick-serve restaurant. At this point, the order is sent to a food preparation terminal for processing (block 516). The order is processed and payment is effected, preferably by authorizing payment via a remote authorization or transaction authority (block 518). As discussed below, the order may be processed immediately or delayed based on the location of the vehicle to ensure the order is timely processed. Next, an order confirmation, order total and/or order ID is transmitted to the IVC (block 520). The IVC will ultimately receive and store the confirmation, order totals and/or order ID (block 522). This information may also be displayed to the occupant in the vehicle (block 524).

Typically, the customer order will be placed at a location apart from the order pickup area 36 of the QSR 22. Thus, the IVC must determine whether or not to transmit order or vehicle identification indicia for ultimate receipt by the quick-serve restaurant for order identification purposes. As noted, any type of communication is acceptable, but the preferred embodiment provides for the IVC to determine if it is being interrogated or is otherwise within range to transmit signals necessary to identify the IVC with the order (block 526). When the vehicle has been interrogated or is within communication range, an ID or code is transmitted for order identification processing (block 528). The ID is transmitted (block 530) to the customer location station 46, which is placed along the drive-thru lane to determine the alignment of vehicles in the drive-thru lane. The QSR will receive the ID information, correlate the ID information with an order (block 532), and determine the location of the vehicle in the drive-thru lane (block 534). Preferably, the necessary control system will alert food preparers of the vehicle's location or position in the drive-thru lane (block 536).

Next, the IVC must determine whether to transmit the order or vehicle identification ID to determine if the IVC is being interrogated or is within range of the order pickup position (block 538). Once the vehicle is within range or is being interrogated (block 540), the IVC will transmit the vehicle or order ID to identify the vehicle most proximate or located at the order pickup position (block 542). This signal will be received at the order pickup position 36 or a prepared order is associated with the vehicle or IVC (block 544), and, preferably, the relevant control system will instruct the QSR operator to deliver the proper order to the corresponding vehicle (block 546), wherein the process ends (block 548).

Transponder Monitoring and Location Detection

In several aspects of the present invention, it is desirable to determine the location and/or proximity of a transponder, whether vehicle mounted or carried by a customer, with respect to a specific fueling position of a dispenser or interrogation system. In other aspects, it is desirable to track the transponder throughout the fueling environment 10. Although the embodiments described herein use the dispenser as a reference, any of the interrogation systems in the fueling environment may be adapted to determine transponder location and/or proximity.

Determining location and proximity of a transponder with respect to a fuel dispenser in a fueling environment presents a unique problem because the fueling environment includes multiple dispensers with multiple positions. At any given time, numerous transponders will be in or moving about the fueling environment and the many interrogation fields associated with the various interrogators. The dispensers and associated control systems must distinguish between personal and vehicle-mounted transponders used to carry out a transaction from transponders attached to a vehicle driving by the fueling position or carried by a person walking by the dispenser. Fueling environments must be able to avoid communicating with a second transponder during a transaction with a first transponder.

Texas Instruments (TI) has a system in a fueling environment capable of communicating with transponders. The beta sites for the Texas Instruments system are believed to communicate with transponders using an interrogator transmitting an interrogation signal having a 134 kHz carrier. Certain transponders within range of the 134 kHz signal will transmit a signal back to the interrogator using either a 134 kHz or a 903 MHz carrier.

The TI system uses two different types of RFID devices: handheld and car mount transponders. The handheld transponder transmits and receives radio communications at 134 kHz. The car mount transponder receives at 134 kHz and transmits at 903 MHz. The dispenser is equipped with a large loop antenna adapted to transmit at 134 kHz and a smaller antenna configured to receive at 903 MHz. The smaller 903 MHz antenna is mounted with the large loop antenna at the top of the dispenser. The TI system also requires an antenna mounted on the dispenser face and adapted to transmit and receive at 134 kHz. The car mount transponder communicates to the fuel dispenser via the large loop antenna located at the top of the dispenser.

The 134 kHz loop antenna sends the car mount transponder its interrogation ID number and the car mount transponder responds with the same ID number so that its signal will be ignored by other dispenser loop antennas that accidentally pick up signals having different interrogation ID numbers. The loop antenna is generally not a directional antenna, but its range can be limited to a defined area with reasonable certainty so that its 134 kHz interrogation signal is not picked up by another car at another dispenser. The loop antenna can be adjusted so that overlap with other loop antennas in the forecourt is minimal or non-existent.

Figure 12A:
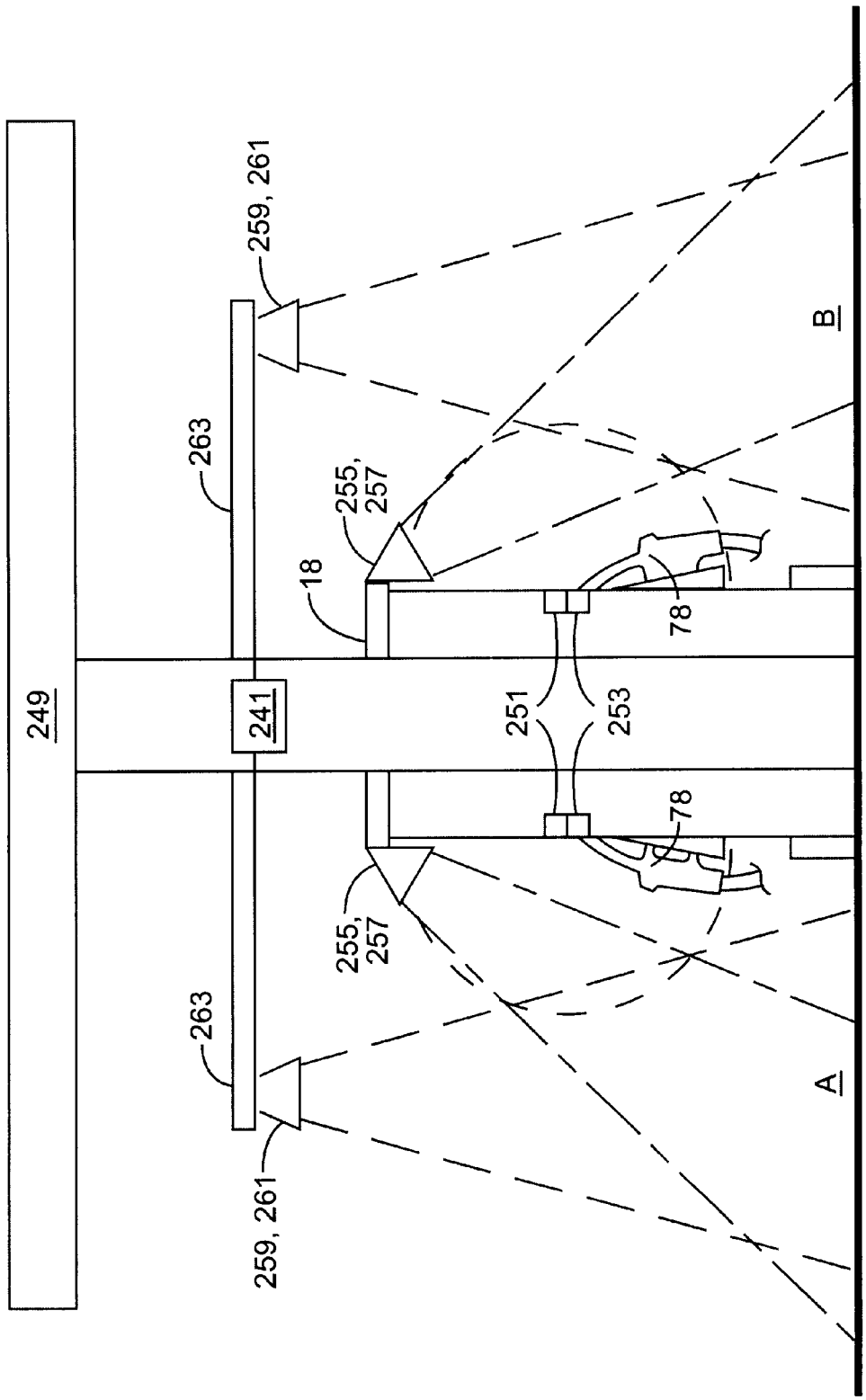
FIG. 12A is a schematic representation of a side view of a dispenser having multiple antenna arrangements for providing directional interrogation fields constructed according to the present invention.
Figure 12B:
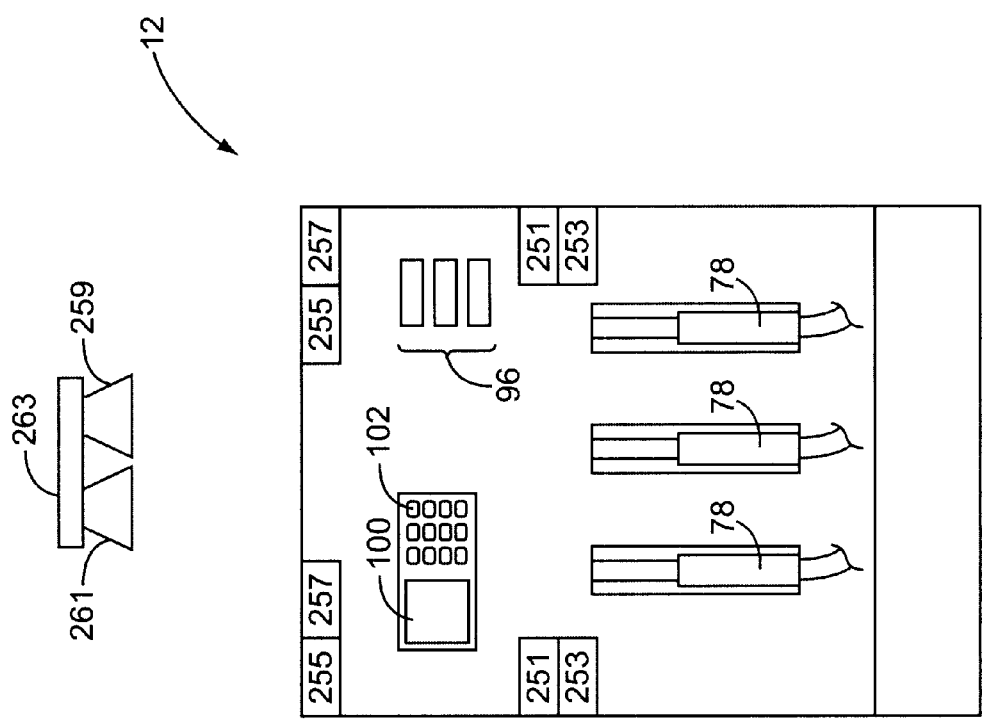
FIG. 12B is a schematic representation of a front view of a dispenser having multiple antenna arrangements for providing directional interrogation fields constructed according to the present invention.

One arrangement of applicants' antennas is shown in FIGS. 12A and 12B. In FIG. 12A, a side view of a fuel dispenser 18 under a canopy or awning 249 is shown with multiple configurations of antennas adapted to communicate with various transponders proximate to either of the fueling positions A or B. The antennas are adapted to transmit, receive or transmit and receive at substantially directional frequencies, including those in the microwave range, and preferably around about 2.45 GHz. In these embodiments, there are basically three suggested antenna locations wherein various combinations of antennas at these locations are used. Please note that the antennas of FIGS. 12A and 12B are not referenced as 108, for the sake of clarity in describing antenna placement.

The first antenna location is near the middle of a front face of the dispenser 18. A mid-dispenser transmit antenna 251 and mid-dispenser receive antenna 253 are placed near this midpoint. The antennas may be located in the central portion of the dispenser or located anywhere along the front face of the dispenser, including near the respective sides of the dispenser as shown in FIG. 12B. The mid-dispenser antennas 251, 253 preferably provide a limited power and limited range field pattern to communicate with a transponder 66 carried by a customer. The field provided by the mid-dispenser transmit antenna 251 is preferably large enough to properly communicate with the customer-carried transponder 66 in the fueling position and in front of the dispenser without requiring the customer to remove the transponder from a purse, wallet or pocket and wave the transponder next to the dispenser 18 or a receiving antenna.

Additionally, a top-mount transmit antenna 255 and top-mount receive antenna 257 may be provided at or near the top of the dispenser 18 and adapted to provide a focused, directional and preferably conically shaped field downward over the respective fueling position. These top-mount antennas 255, 257 are preferably located on each side of the dispenser 18 as shown in FIG. 12B in similar fashion to the preferred placement of the mid-dispenser antennas 251, 253. The duplication and spacing of these antennas help avoid interference caused by people or other objects breaking the communication path between the respective antenna and transponder. This allows the transponder to communicate with the dispenser through one antenna or set of antennas, even if something blocks the field from the other set of antennas.

Another option is to place the antenna substantially directly over the fueling position A or B. In such an embodiment, overhead receive antenna 259 and overhead transmit antenna 261 are mounted over the fueling position A, B using an overhead antenna mount 263. The overhead antennas 261, 263 operate in the same manner as the top-mount antennas 255, 257, and may also be spaced apart to provide varying positions to create an interrogation field. Notably, the antennas for receiving and transmitting may be combined into one wherein a suitable circulator or like electronics 241 is incorporated into the interrogator or communications electronics to provide for reception and transmission from a single antenna. With any of these embodiments, the antennas may cooperate directly with the central control system 50 or with the dispenser control system 80 to allow overall system monitoring of transponders at the various positions. In these situations, the selected control system will alert the dispenser of transponder presence.

As noted, various combinations of these antennas can be used. For example, the preferred embodiment includes two mid-dispenser transmit antennas 251, two top-mount transmit antennas 255, and two top-mount receive antennas 257. The top-mount receive antennas 257 are adapted to receive signals transmitted from the transponder in response to signals from either the mid-dispenser transmit antennas 251 or the top-mount transmit antennas 255. In operation, when a customer-carried transponder 66 enters the field provided by the mid-dispenser transmit antenna 251, the transmitter reflects a signal which is received by the top-mount receive antenna 257. Alternatively, vehicle-mounted transponders 64 may enter the interrogation field provided by the top-mount transmit antenna 255 and respond with a signal received by the top-mount receive antenna 257.

The interrogation fields provided by any of the transmit antennas 251, 255, 259 may be adjusted to control the size and shape of the respective fields. For example, the system may be configured to more easily distinguish between transponders carried by a person and vehicle-mounted transponders by configuring the respective interrogation fields provided by the mid-dispenser transmit antenna 251 and the top-mount transmit antenna 255 or overhead transmit antenna 259, such that the respective interrogation fields do not overlap or overlap in a desired and select pattern. Thus, communications resulting from an interrogation with the mid-dispenser transmit antenna 251 indicate a transponder carried by the customer while communications resulting from the top-mount or overhead transmit antenna 255, 259 may be indicative of vehicle-mounted transponders.

Figure 12C:
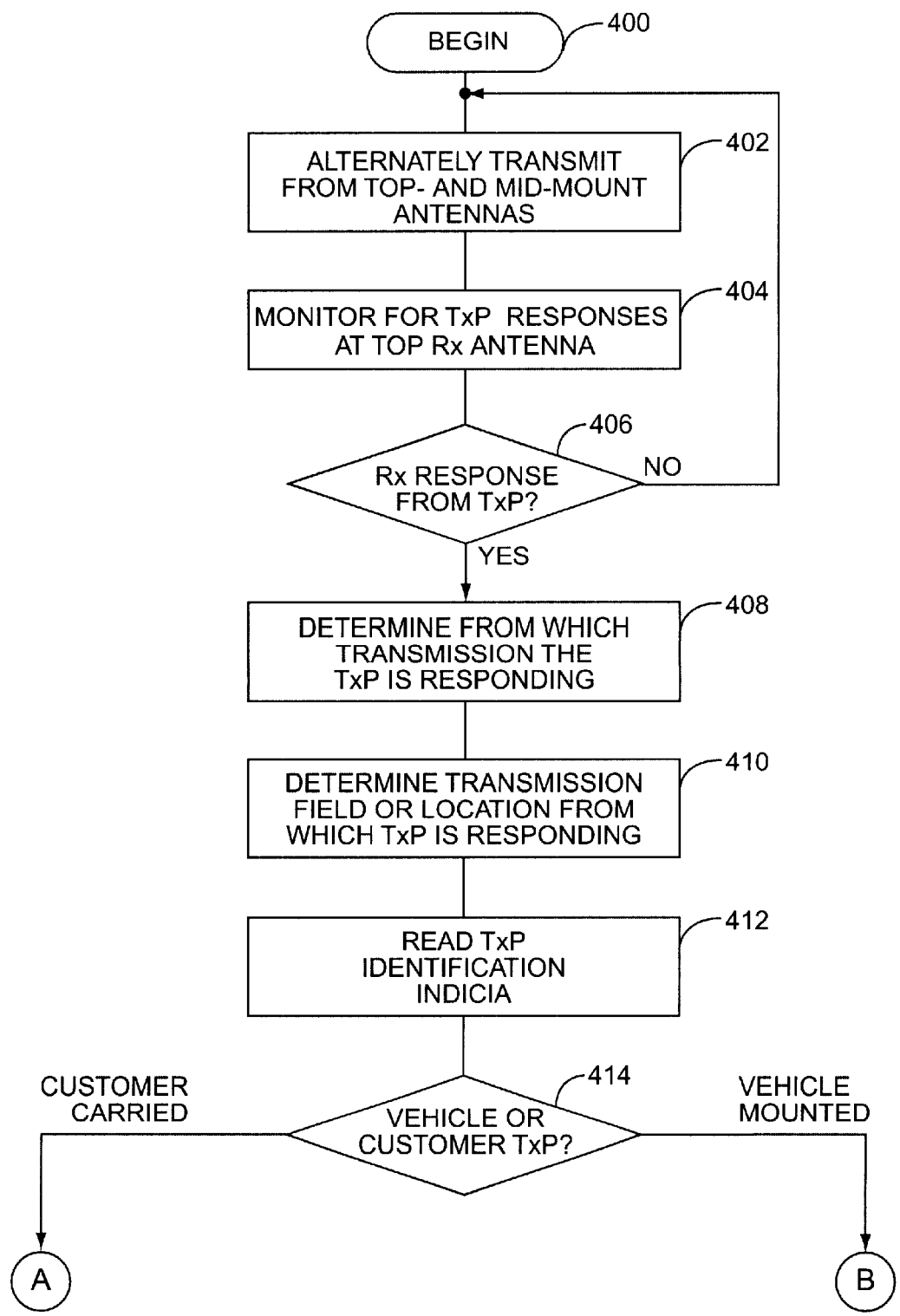
FIGS. 12C and 12D are a flow chart of a basic process for monitoring the location and type of transponder at a fueling position according to a preferred embodiment of the present invention.
Figure 12D:
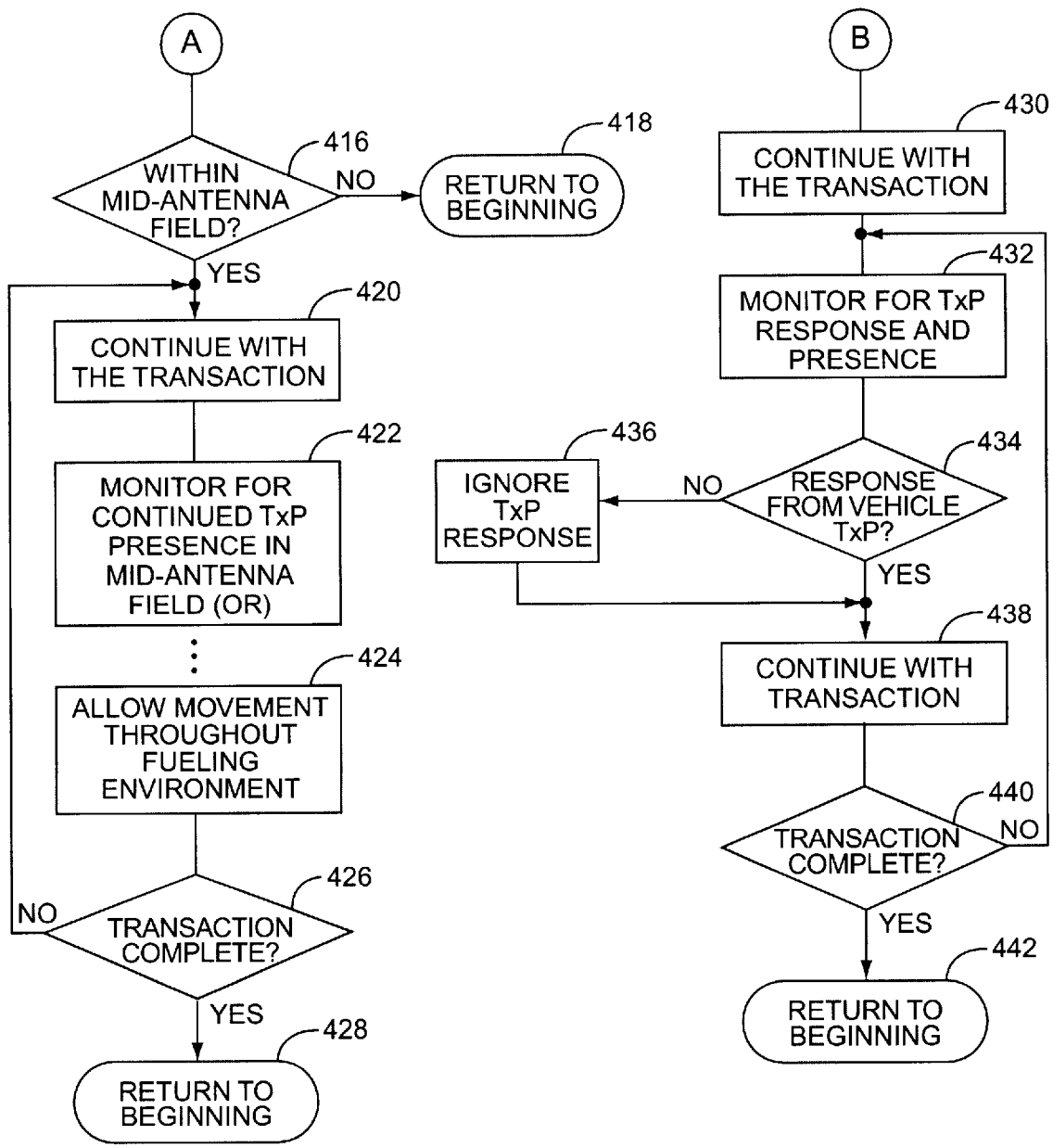

Attention is now drawn to FIGS. 12C and 12D, which depict a flow chart of a basic process for monitoring the location and position of a particular type of transponder using top-mount transmit antennas 255 or overhead transmit antennas 259 and a mid-dispenser transmit antenna 251 in conjunction with one or more top-mount or overhead-mount receive antennas 257, 261. In this preferred embodiment, one or more of the transmit antennas mounted substantially above the customer will alternate sending interrogation signals with one or more of the mid-dispenser transmit antennas 251. A response to either of these interrogation signals is received at a receive antenna mounted substantially above the customer, such as one of the top-mount receive antennas 257 or overhead receive antennas 261.

The basic operation of this embodiment begins (block 400) by alternately transmitting from the top and mid-mount antennas (block 402). The central control system 50 or dispenser control system 80 will monitor for responses from transponders within one of the interrogation fields (block 404). The control system will continue to monitor for a transponder response until a signal from a transponder is received (block 406). The control system will next determine from which transmission field the transponder is responding (block 408). In this embodiment, where the transmission fields alternate, the control system will simply determine if a transponder response was received during a time period when the top or overhead-mount antennas were generating the interrogation field or if the response occurred during the time the mid-dispenser transmit antenna 251 was generating the interrogation field.

Once the control system determines the field in which the transponder is responding, the appropriate location of the transponder is known (block 410). Typically, the transponder's response to the interrogation signal provides transponder identification indicia indicative of the type of transponder being interrogated (block 412). The type of transponder is generally vehicle mounted or carried by the person. Determining whether the transponder is vehicle mounted or carried by the person enables the control system to determine how to react to the presence of other transponders passing through the various interrogation fields during a communication with another transponder or make sure a transponder is properly located for the desired transaction. If the control system determines the transponder is one carried by a person (block 414) and that the transponder was within the mid-antenna field (block 416), the control system allows the transaction to continue (block 420). If the transponder is a customer-carried transponder that is not within the mid-antenna field (blocks 414 and 416), the control system will return to the beginning of the process (block 418). The latter situation is indicative of a transponder carried by the person being interrogated in one of the top or overhead antenna fields, which are preferably used to interrogate vehicle-mounted transponders exclusively. Thus, the system preferably ignores transponders carried by the person outside of the mid-antenna field, which is preferably focused in a manner requiring the customer to be substantially in front of the customer interface of the appropriate fueling position. The field associated with the mid-dispenser transmit antenna 251 is limited only by design choice and may extend several or more feet in front and to the sides of the fuel dispenser.

If the control system is communicating with a customer-carried transponder within the mid-antenna field, the control system may monitor for the continued presence of the transponder in the mid-antenna field (block 422) or allow movement of the customer-carried transponder throughout the fueling environment (block 422). Notably, it is often desirable to only require the customer-carried transponder to be within the mid-antenna field long enough to start the transaction and fueling operation, and allow the customer to leave the fueling area during the fueling operation. Unlike a customer carried transponder, the control system would preferably require the presence of the vehicle in the appropriate transmission field throughout the fueling operation for safety reasons. Regardless of how the control system monitors the presence or movement of the customer-carried transponder during the transaction, the transaction will continue until complete (block 426), wherein the process will begin anew (block 428).

If the control system determines a vehicle-mounted transponder is within the appropriate transmission field (block 414), the transaction will continue (block 430).

Preferably, the control system will make sure that the vehicle has stopped moving and has been in position long enough to indicate a transaction associated with the responding transponder is likely. As noted above, the control system will preferably continue to monitor for the vehicle-mounted transponder's presence (block 432) throughout fueling. The control system is preferably capable of distinguishing responses from the vehicle-mounted transponder associated with the transaction from other personal or vehicle-mounted transponders entering one or more of the transmission fields (block 434). If a response to an interrogation signal is received that does not correspond to the vehicle-mounted transponder associated with the transaction, the response is ignored (block 436).

Preferably, the control system will ignore all responses of customer-carried transponders in the top-mount or overhead transmission fields. Erroneous responses from other vehicles are rejected based on the control system recognizing a response from a vehicle-mounted transponder having a different identification indicia from the vehicle-mounted transponder associated with the ongoing transaction. Likewise, the control system will ignore responses from transponders other than the authorized transponders to avoid communicating with transponders of other customers entering the field during a transaction. In such case, the control system may check the identification indicia to ensure communication continue with the appropriate transponder. During this time, the control system will continue with the transaction (block 438) until the transaction is completed (block 440).

If the transaction is not complete, the control system will continue to monitor for the presence of the vehicle-mounted transponder and any other transponders in the area (blocks 432–440). Once the transaction is complete (block 440), the process returns to the beginning (block 442). Although the preferred embodiment provides for mid and overhead transmission fields wherein transponder responses are received near the top or above the dispenser, those skilled in the art will recognize that numerous modifications of this configuration are within the inventive concept disclosed herein and subject to the claims that follow.

As noted, the interrogation communications system preferably communicates using substantially directional radio frequencies in conjunction with antennas configured to provide precisely shaped and directed interrogation fields. Communications at these frequencies are generally limited to line-of-sight communications wherein arranging the antennas to cover a common interrogation field from different locations avoids parallax and the effect of interference from objects coming between the transponder and one of the antennas. Generally, communications will require the absence of metal objects coming between the antennas and transponders. Thus, when antennas are mounted within the dispenser, glass or plastic dispenser walls are preferable. Furthermore, vehicle-mounted transponders are preferably placed on the windows or behind non-metal portions of the vehicle to avoid interference.

Preferably, high-gain antennas are used to provide a highly directional and configurable cone shape covering an area most likely to include a transponder when a vehicle is properly positioned for fueling. The antenna range and transmission power is typically adjusted to provide the desired interrogation field while minimizing the potential for the transponder to reflect signals to antennas associated with other fueling positions.

Another benefit provided by an embodiment of the present invention is that spread-spectrum communications limits the likelihood that an interrogator in the system will synchronize with a transponder being interrogated by another interrogator. Thus, a preferred embodiment of the present invention provides for a communications system capable of distinguishing between transponder types, limiting the potential of transponders erroneously communicating with another interrogator, simplifying communications by using the same carrier for transmission and reception, extending the interrogation field to more easily communicate with vehicle-mounted transponders, reducing the size of the antennas required for communication, and allowing either the same or same type of antenna to be used for transmission and reception.

Alternate Antenna Configuration

Figure 13A:
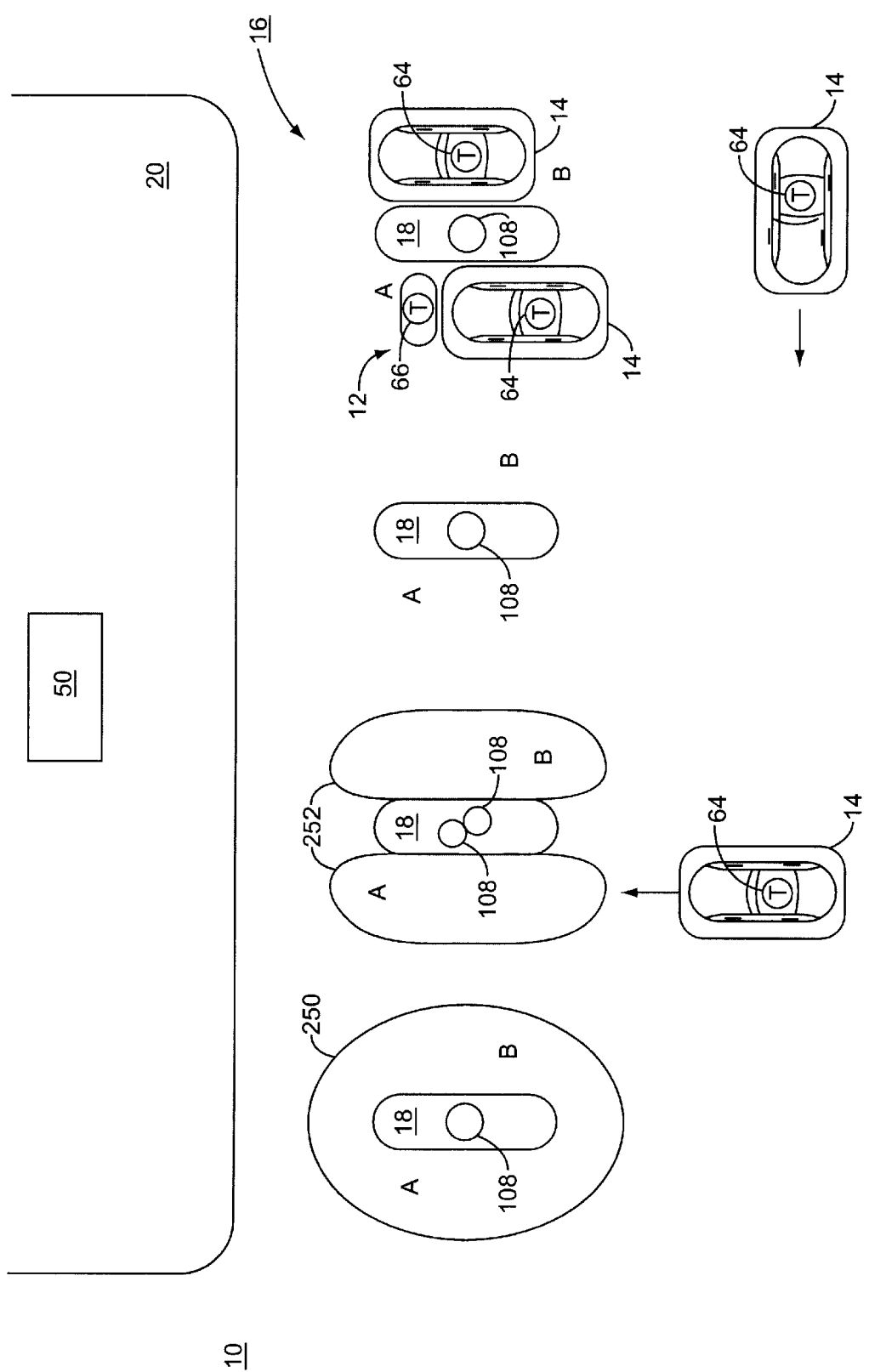
FIG. 13A is an overhead schematic representation of a fueling environment having antenna arrangements providing various interrogation fields.

Turning now to FIG. 13A, an alternative fueling environment 10 is shown having a station store 20 and the central control system 50 configured to communicate with each of the dispensers 18. Multiple vehicles 14 are depicted in and around the various fuel dispensers 18. Each of the dispensers may include an antenna 108. These antennas 108 may be operatively associated with a corresponding dispenser interrogator 52 and dispenser control system 80 (see FIG. 5). Please note that antenna placement will depend upon the application and may include placing the antennas anywhere in the fueling environment 10 separate from the dispensers 18. Placing the antennas at non-dispenser locations is especially operable in applications where the antennas are used to determine transponder location.

The antenna 108 and dispenser 18 configuration in FIG. 13A is specifically adapted to determine the proximity of a vehicle relative to a particular fueling position A, B associated with each dispenser 18. The different reception patterns are depicted in association with the two left most dispensers 18. The circular reception pattern 250 would be used to determine the proximity of a vehicle with respect to a particular dispenser 18. Generally, only one antenna 108 is required for such an embodiment. As a vehicle approaches the dispenser having the circular pattern 250, the dispenser's corresponding interrogator 52 and dispenser control system 80 will receive a signal transmitted from the transponder 12, 14. The dispenser control system 80 will analyze certain characteristics of the signal received from the transponder, such as magnitude or strength, to determine a relative proximity to the dispenser. Typically, a dispenser 18 having an antenna configuration providing the basic circular pattern 44 is not able to distinguish at which side or fueling position A, B, the vehicle is positioned.

Figure 16:
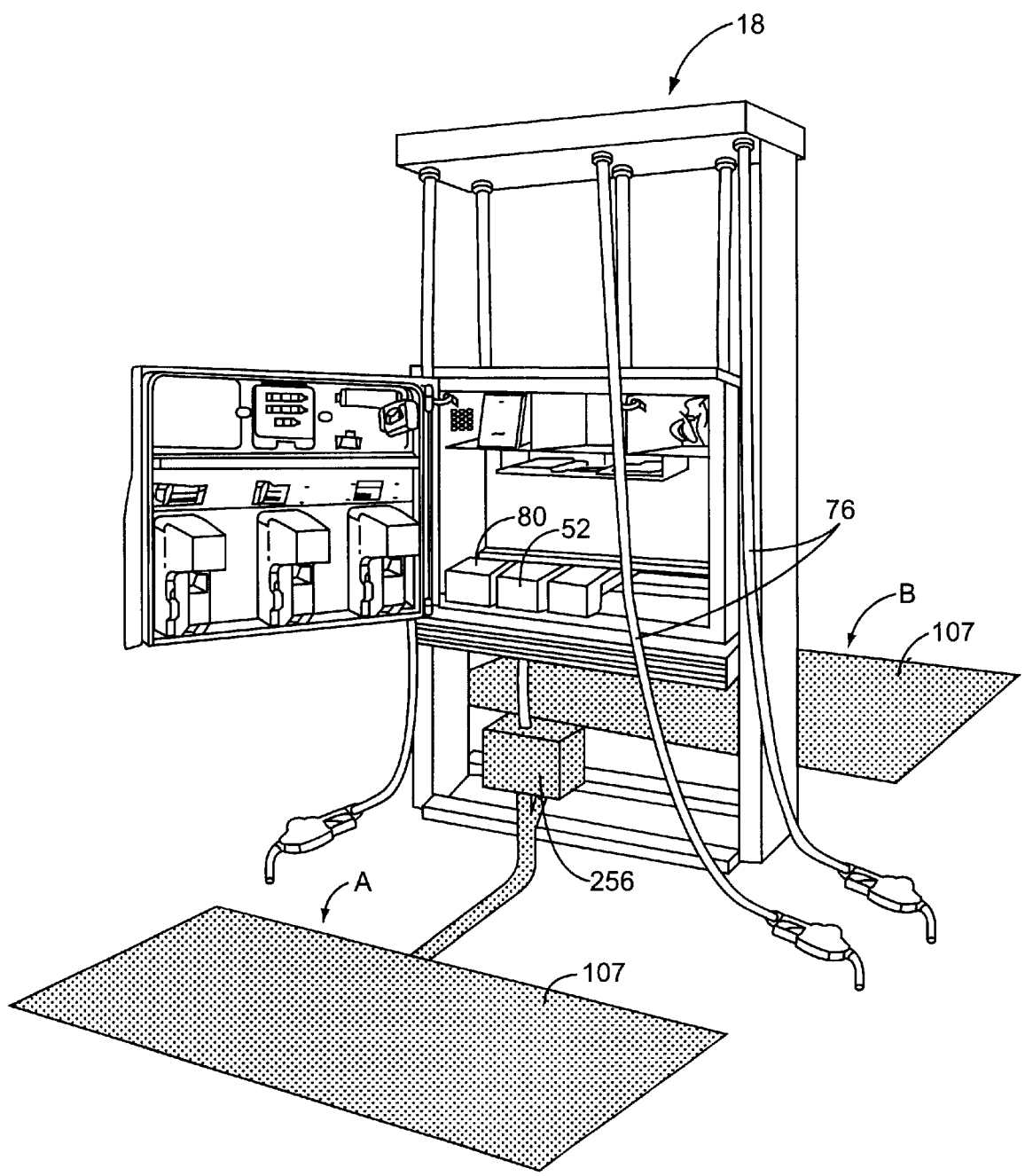
FIG. 16 is a perspective view of a fuel dispenser having underground antennas constructed according to the present invention.

A dual-lobed pattern 252 associated with the second dispenser 18 from the left in FIG. 13A provides the dispenser control system 80 the ability to determine at which fueling position A, B the vehicle is located or approaching. In order to determine the particular fueling position A, B, a directional component is necessary in addition to the proximity component described above. To provide this directional component, multiple antennas may be used to create various types of reception lobes where the antennas may be configured to only receive signals from certain pre-set directions or areas. Regardless of the configuration, the dispenser control system 80 will monitor a characteristic of the signal determinative of proximity, such as magnitude or strength, in conjunction with determining the fueling position A, B to which the signal appears most proximate. In the dual-lobed embodiment 252, the dispenser control system 80 may measure the signal characteristics received at both antennas 108 to determine from which antenna the received signal was strongest in order to determine direction. Using directionally configured antennas will allow each antenna to focus on one fueling position. Alternatively, placing the antennas 107 in the forecourt under each fueling position allows for easy determination of vehicle placement relative to a fueling position as shown in FIG. 16.

The dispenser control system 80 may include electronics capable of detecting signal strength or magnitude and monitor for variations therein. The magnitude monitoring circuitry 256 preferably includes automatic gain control electronics feeding the received signal into an analog-to-digital converter. Signal strength is turned into an 8-bit digital string corresponding to a signal magnitude. The dispenser control system 80 will monitor the string for variations in signal strength. As the signal magnitude increases, the dispenser control system 80 will determine that the transponder is approaching, and vice versa.

Figure 14A:
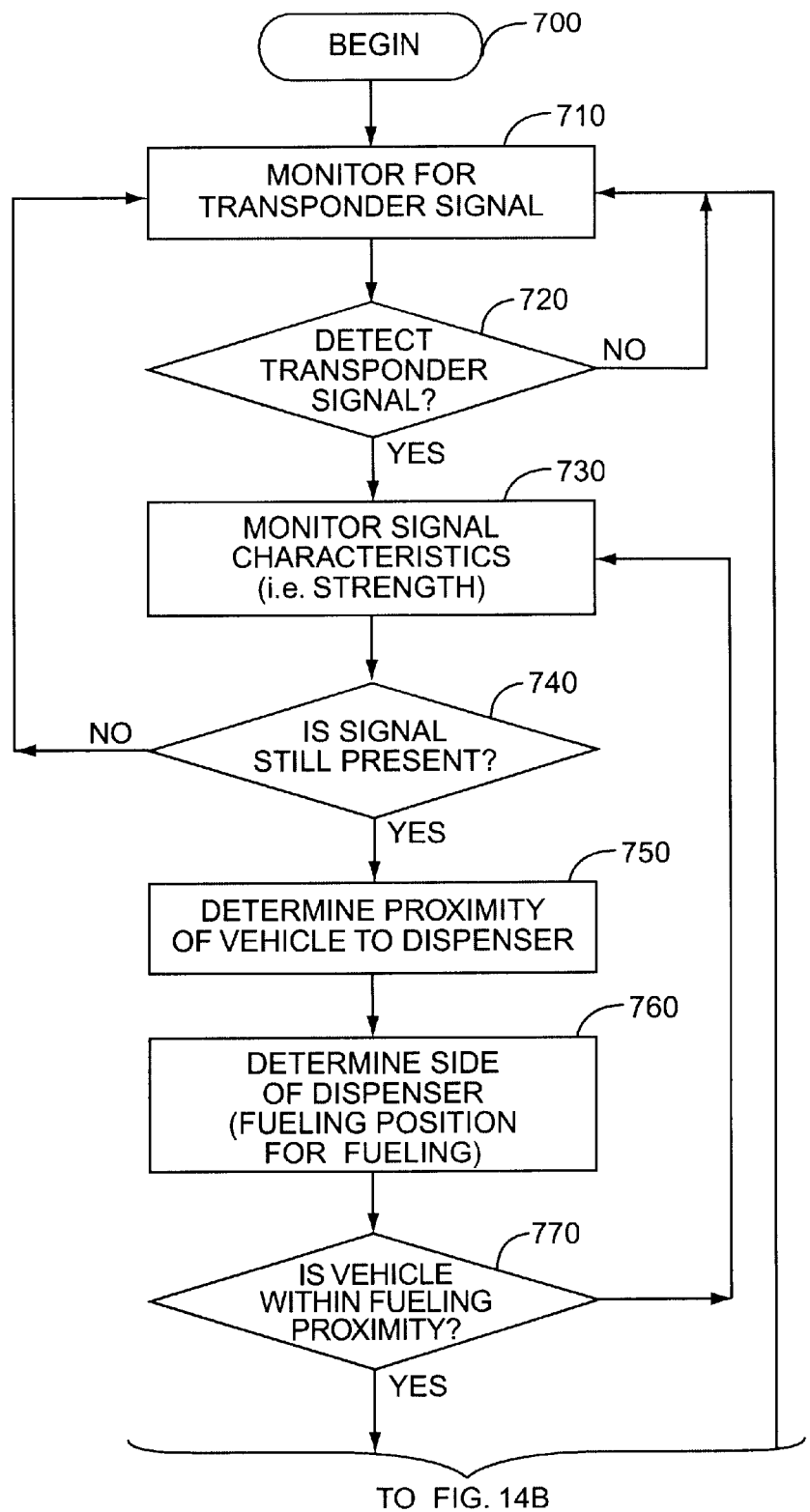
FIGS. 14A and 14B are a flow chart of a basic process for determining the proximity or location of a transponder with respect to a particular fueling position at a dispenser according to the present invention.
Figure 14B:
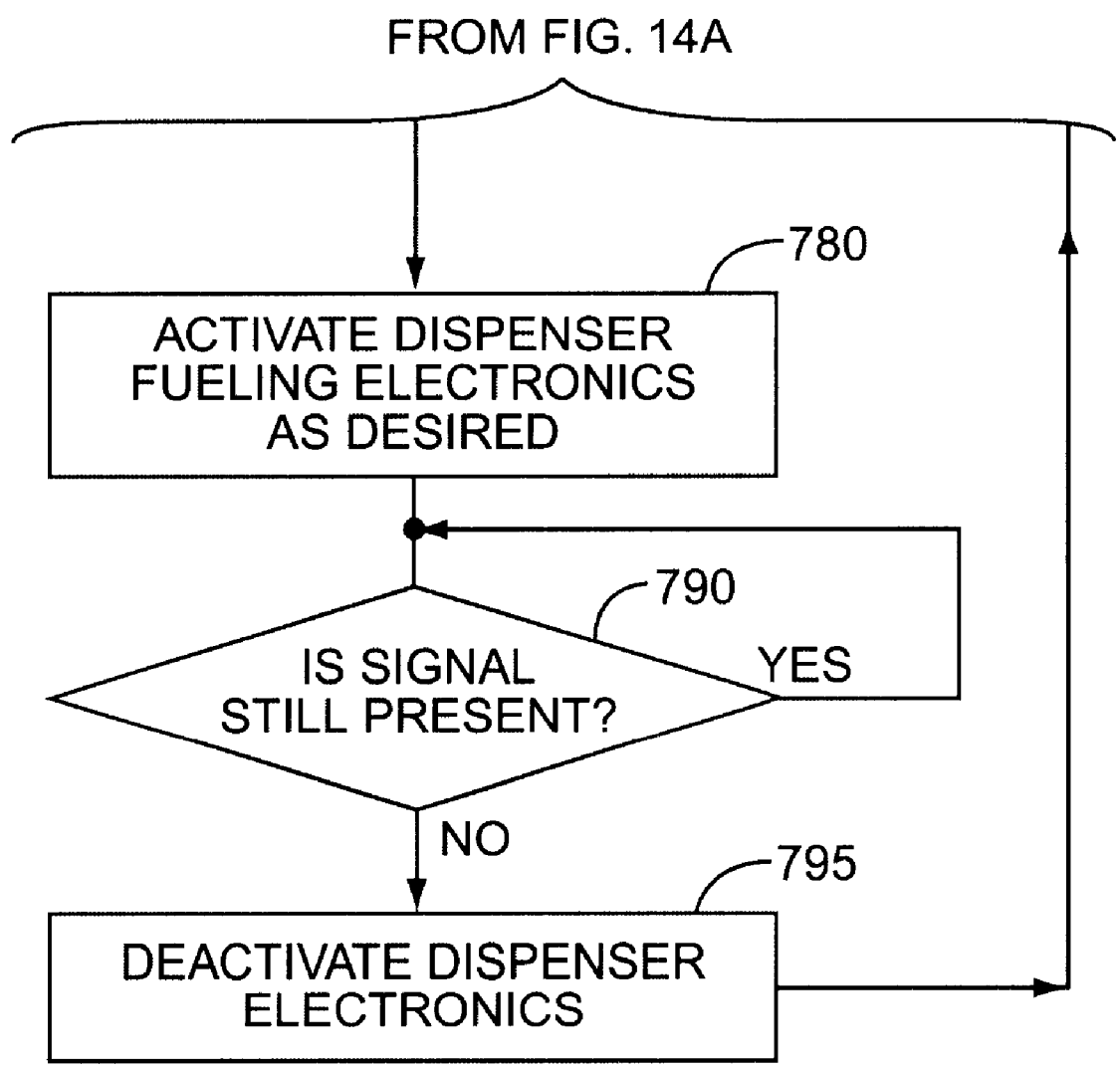

The flow chart of FIGS. 14A and 14B outlines the process undertaken by the dispenser control system 80 to determine the proximity or location of a transponder 64, 66 with respect to a particular fueling position A, B of a dispenser 18. The process begins (block 700) with the dispenser control system 80 beginning to monitor for a transponder signal (block 710). The signal may originate from an active transmitter in the transponder or may reflect or scatter back to a dispenser interrogator 52 and antenna 108. Upon detection of a transponder signal (block 720), the dispenser control system 80 will monitor a characteristic, such as magnitude or phase of the signal (block 730). At this point, the dispenser control system 80 recognizes a transponder 64, 66 as near or approaching the dispenser 18 and continues to monitor for the presence of the signal (block 740). If the signal is lost or decreases, the dispenser control system 80 will determine that the transponder has left or is leaving the reception area and will begin to monitor for a new transponder signal (block 710). If the signal remains present and/or increases, the dispenser control system 80 will determine the proximity of the vehicle with respect to the dispenser (block 750). Preferably, the dispenser control system 80 will monitor to determine whether or not the signal strength is changing to ensure that the vehicle-mounted transponder 64 does not move during the fueling operation.

In order to determine the particular fueling position A, B at which the transponder is located, the dispenser control system 80 must determine which side of the dispenser the vehicle is at or approaching (block 760). The dispenser control system 80 may simply monitor the signal with antennas at or near the particular fueling position designed to receive using a directionally sensitive antenna configuration, such as the embodiment of FIGS. 12A and 12B, the dual-lobed configuration 252 of FIG. 13A, or the underground antennas 107 shown in FIG. 16.

Reference is again directed to FIGS. 14A and 14B. As a transponder approaches a particular fueling position A, B, the dispenser control system 80 determines if the transponder is within a certain fueling proximity (block 770). When the vehicle is within fueling proximity, it is in a position close enough for the fuel dispenser 18 at the corresponding fueling position A, B to allow fueling of the vehicle. If the vehicle is not within fueling proximity, the dispenser control system 80 continues to monitor the strength and direction of the signal (blocks 730–760). The dispenser control system 80 may determine whether the transponder or vehicle is within fueling proximity by simply receiving the transponder signal, receiving a signal magnitude above a predefined threshold, and/or determining whether the signal magnitude is changing, indicating that the transponder and vehicle are moving.

Once the vehicle is in position for fueling, the dispenser control system 80 activates the dispenser's fueling electronics as desired (block 780). During the fueling operation, the dispenser control system 80 continues to monitor for the presence of a signal in decision block 790. When the signal is no longer present, the dispenser electronics are deactivated at block 795, and the dispenser control system 80 monitors for the next transponder signal at block 710 causing the process to repeat.

Figure 13B:
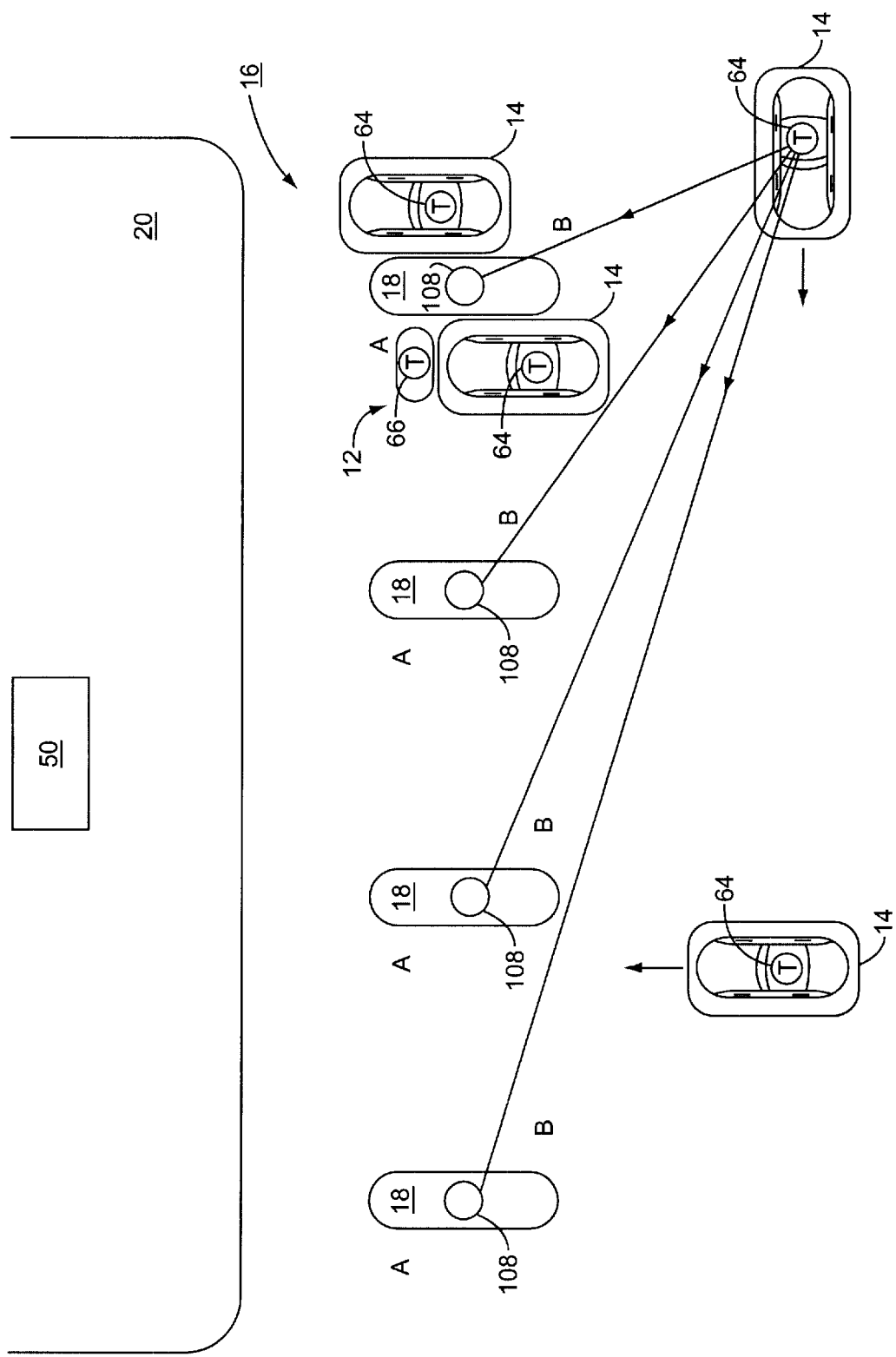
FIG. 13B is an overhead schematic representation of a fueling environment having antenna arrangements providing continuous location monitoring of transponders in the fueling environment.

FIG. 13B depicts an embodiment wherein the location of transponders may be tracked as they travel throughout the service station environment 10. In this embodiment, the dispensers 18 each include an antenna 108 capable of receiving a signal from a transponder 64. Preferably, signals from the antennas 108 are multiplexed together at the central control system 50. The various control systems will receive the transponder signal and monitor the location of the vehicle and determine the dispenser 18 and fueling position A, B at which the vehicle stops. The dispenser control system 80 may, for example, monitor a characteristic, such as the phase, of the signal received by the various antennas 108 associated with the dispensers 18 and use known computational techniques, based on the signal characteristics received at the various antenna locations, to determine vehicle location. One such technique using phase differences is triangulation.

Although the signal of only one vehicle transponder 64 is depicted, the various dispensers 18 and/or the central control system 50 may monitor for the presence and location of a plurality of vehicles to determine proximity, direction of travel and location throughout the fueling environment 10. Triangulation and other similar positioning and locating techniques generally require at least two antennas and provide better resolution as the number of antennas 108 increase. The location of the respective antennas 108 may be virtually anywhere in the fueling environment 10. Another alternative to multiplexing the various antennas located at the respective dispensers 18 or elsewhere in the fueling environment 10 is to use multiple antennas in each dispenser or throughout the fueling environment 10. Additionally, a global positioning system (GPS) could be used to communicate vehicle position directly or through a remote network 94 to the central control system 50 and on to the fuel dispenser 18.

Figure 15:
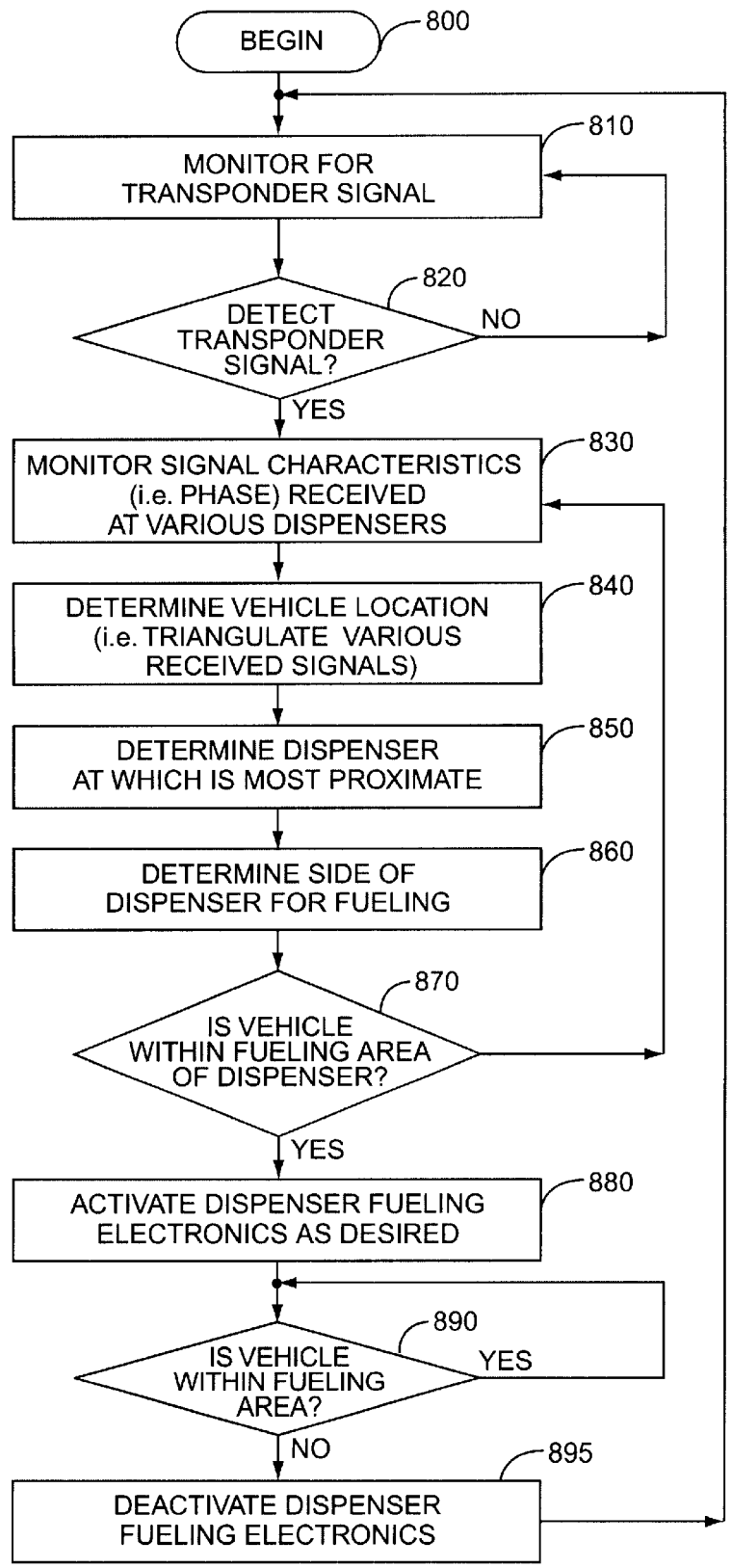
FIG. 15 is a flow chart of a basic control process for determining transponder location for an embodiment similar to that depicted in FIG. 13B.

The flow chart of FIG. 15 outlines the control process for the embodiment depicted in FIG. 13B. The process begins (block 800) and initially monitors for the presence of a transponder signal (block 810). Once the signal is received (block 820), the dispenser control system 80 monitors the characteristics of the signal for various antennas (block 830). The dispenser control system 80 will next determine the location of the transponder (block 840) using the monitored signal characteristics at the various antennas to triangulate or otherwise determine vehicle location. The precise fueling position A, B of the corresponding dispenser 18 is determined (blocks 850 and 860) by calculating the position at which the vehicle stopped. The dispenser control system 80 for the dispenser where the vehicle stopped will determine if the vehicle is within the fueling area (block 870). If the vehicle is within the fueling area, the dispenser's fueling electronics are activated as desired (block 880). The dispenser control system 80 will continually monitor the location of the vehicle to determine if the vehicle remains within the fueling area (block 890). Once the fueling operation is over and the vehicle leaves the fueling area, the dispenser control system 80 deactivates the dispenser's fueling electronics (block 895) and monitors for a new transponder signal (block 810), whereupon the process is repeated.

With respect to FIG. 16, an embodiment depicting underground antennas 107 is shown. The two antennas 107 correspond to fueling positions A and B. The antennas are preferably multiplexed at an antenna multiplexer 256. The multiplexer 256 sends the multiplex signals received by the corresponding antenna 107 to the interrogator 52.

Preferably, intrinsically safe barriers are used to provide electrical isolation between the antennas and the multiplexer 256 and/or interrogator 52.

It should be recognized that the various aspects discussed herein can be mixed and matched to provide a fueling environment with various combinations of capabilities. Each aspect was discussed individually in order to provide a more clear disclosure. Furthermore, the various flow charts and processes disclosed herein generally represent programs which are stored in memory and run on an associated controller. Given the shared control responsibilities between the dispenser control systems and the central control system in a typical fueling environment, the control systems defined in the claims that follow are to be construed as including control features provided by dispenser control systems, central control systems and remote network control systems, alone or in combination. Those skilled in the art will recognize the tremendous flexibility in providing the various control aspects throughout the numerous control systems (including remote networks) in and outside of the fueling environment.

Certain modifications and improvements will occur to those skilled in the art upon a reading of the foregoing description. It should be understood that all such modifications and improvements have been deleted herein for the sake of conciseness and readability, but are properly within the scope of the following claims.

What is claimed is:

1. An in-vehicle ordering system comprising:
   a. an occupant interface having a display and input device located within a vehicle cabin, said occupant interface adapted to provide a selection of items to order from a quick service restaurant and receive an occupant order via said input device;
   b. vehicle communication electronics associated with said occupant interface and adapted to wirelessly transmit the occupant order for ultimate receipt at the quick service restaurant; and
   c. a control system configured to display said selection of items to order on said display, determine the occupant order based on occupant input received via said input device, and effect wireless transmission of the occupant order.

2. The in-vehicle ordering system of claim 1 wherein said control system includes memory, and said selection of items to order is pre-stored in said memory.

3. The in-vehicle ordering system of claim 1 wherein said control system is configured to display said selection of items to order, receive the occupant order, and store the occupant order.

4. The in-vehicle ordering system of claim 3 wherein said control system is further configured to effect wireless transmission of the occupant order when an occupant input to transmit said order is received at said input device.

5. The in-vehicle ordering system of claim 3 wherein said control system is further configured to effect wireless transmission of the occupant order when a remotely transmitted signal is received via said vehicle communication electronics.

6. The in-vehicle ordering system of claim 3 wherein said control system is further configured to effect wireless transmission of the occupant order when a remotely transmitted signal is received from a transmitter associated with a fuel dispenser.

7. The in-vehicle ordering system of claim 1 wherein said vehicle communication electronics are configured to receive a remotely transmitted signal comprising the selection of items to order, and said control system is configured to receive the selection of items to order from said vehicle communication electronics and display the selection of items to order on said display.

8. The in-vehicle ordering system of claim 1 wherein said vehicle communication electronics are configured to communicate with a first communication station configured to receive the occupant order and a second communication station configured to identify the occupant, vehicle, or said associated occupant order, said control system adapted to transmit via said vehicle communication electronics:
   said occupant order to the first communication station, and
   identification indicia to the second communication station.

9. The in-vehicle ordering system of claim 1 wherein said vehicle communication electronics are configured to communicate with a first communication station configured to receive the occupant order, a second communication station configured to identify the occupant or vehicle associated with the occupant order, and a third communication station configured to identify the occupant, vehicle, or said associated occupant order, said control system adapted to transmit via said vehicle communication electronics:
   a. said occupant order to the first communication station,
   b. identification indicia to the second communication station, and
   c. identfication indicia to the third communication station.

10. An in-vehicle ordering system comprising:
   a. an occupant interface having a display and input device located within a vehicle cabin, said occupant interface adapted to provide a selection of items to order from a quick service restaurant and receive an occupant order via said input device;
   b. vehicle communication electronics associated with said occupant interface and adapted to wirelessly transmit the occupant order for ultimate receipt at the quick service restaurant;
   c. an order processing station at the quick service restaurant where orders are processed; and
   d. station communication electronics for receiving the occupant order and communicating the occupant order to said order processing station.

11. A remote ordering system configured to ultimately communicate with an in-vehicle order interface, said ordering system comprising:
   communication electronics adapted to ultimately communicate with vehicle communication electronics associated with the in-vehicle order interface;

an order processing terminal at a quick-serve restaurant adapted to display the occupant order for a food preparer; and a control system associated with said communication electronics and said occupant order processing terminal;

said control system adapted to:
   a. receive the occupant order via said communication electronics;
   b. receive occupant account information;
   c. send the occupant order to said order processing terminal for processing; and
   d. effect payment for the occupant order based on said occupant account.

12. The remote ordering system of claim 11 wherein said communication electronics are located at a fuel dispenser apart from the quick-serve restaurant.

13. The remote ordering system of claim 11 wherein said communication electronics are located in a fuel station forecourt with fuel dispensers apart from the quick serve restaurant.

14. The remote ordering system of claim 11 wherein said communication electronics are configured to communicate with a satellite.

15. The remote ordering system of claim 11 wherein said communication electronics are configured to communicate with a ground-based communication station.

16. The remote ordering system of claim 11 wherein said communication electronics receive signals including the occupant order originating at the in-vehicle order interface and transmit signals containing information for ultimate receipt by the in vehicle order interface.

17. A multistage order system interacting with an in-vehicle occupant order system comprising:
   a) a fuel dispenser having first remote communications electronics adapted to provide wireless communications with the in-vehicle occupant order system;
   b) an order receipt position apart from said fuel dispenser for providing the customer with an order and having:
      i) second remote communications electronics adapted to provide wireless communications with the in-vehicle occupant order system; and
      ii) an output indicating the customer who placed the order is at the order receipt location;
   c) a control system associated with said first remote communications electronics of said fuel dispenser and said second remote communications electronics and said output of said order receipt position, said control system adapted to:
      i) communicate with the in-vehicle occupant order system through said first remote communications electronics when the in-vehicle occupant order system is proximate said fuel dispenser;
      ii) communicate with the in-vehicle occupant order system through said second remote communications electronics when the in-vehicle occupant order system is proximate said order receipt location; and
      iii) identify the order at the order receipt location associated with the in-vehicle occupant order system of the customer who placed the order at the in-vehicle occupant order system and provide said output indicating that the customer who placed the order is at the order receipt location.

18. The multistage order system of claim 17 wherein said first and second remote communications electronics are adapted to receive data from the in-vehicle occupant order system.

19. The multistage order system of claim 18 wherein data transmitted to said first and second communications electronics includes an in-vehicle occupant order system identifier and said control system associates the customer order with the in-vehicle occupant order system identifier.

20. The multistage order system of claim 19 wherein the identifier is an in-vehicle occupant order system identification number.

21. The multistage order system of claim 17 wherein said first remote communications electronics is adapted to transmit data to the in-vehicle occupant order system and said second remote communications electronics is adapted to receive data from the remote communications unit.

22. The multistage order system of claim 21 wherein said control system is adapted to:
   a) provide order identification data and transmit said order identification data to the in-vehicle occupant order system when the order is transmitted from the in-vehicle occupant order system; and
   b) receive the order identification data from the in-vehicle occupant order system via said second communications electronics to identify the customer at said order receipt location.

23. The multistage order system of claim 22 wherein said order identification information is an order identification code.

24. The multistage order system of claim 22 wherein said order identification information includes actual order information.

25. The multistage order system of claim 22 wherein said order identification information is an order reference number.

26. The multistage order system of claim 17 wherein said first and second remote communications electronics are adapted to receive data from and transmit data to the in-vehicle occupant order system.

27. The multistage order system of claim 17 wherein said order receipt location includes an automatic car wash wherein the customer may order a car wash via the in-vehicle occupant order system and said control system will activate said car wash with said output when the customer is at an appropriate location proximate said order receipt location.

28. The multistage order system of claim 17 wherein said order receipt location includes a quick serve restaurant wherein the customer may order food or drink via the in-vehicle occupant order system and pick up the food order at said order receipt location.

29. The multistage order system of claim 17 wherein said order receipt location includes a vending machine wherein the customer may order food or drink via the in-vehicle occupant order system and pick up the food order at said order receipt location.

30. The multistage order system of claim 17 wherein said control system is associated with a remote payment/authorization network and the in-vehicle occupant order system is adapted to transmit financial data of the occupant to the fuel dispenser, said control system transmitting the financial data to the payment/authorization network to facilitate payment of fuel and the order.

31. The multistage order system of claim 17 wherein said communications electronics include interrogators adapted to transmit signals capable of being received and modified for transmission back to the interrogator by the in-vehicle occupant order system to facilitate communications.

32. The multistage order system of claim 17 wherein said communications electronics are adapted to communicate with a plurality of in-vehicle occupant order systems.

33. The multistage order system of claim 17 wherein said control system includes a dispenser controller located with said fuel dispenser and adapted to operate said first remote communications electronics.

34. The multistage order system of claim 17 wherein said control system includes an order processing controller associated with said order receipt location and adapted to operate said second communications electronics.

35. A multistage order system comprising:
 a) a fuel dispenser having first remote communications electronics adapted to provide wireless communications with the in-vehicle occupant order system;
 b) an order receipt position apart from said fuel dispenser for providing the customer with an order and having:
  i) second remote communications electronics adapted to provide wireless communications with the in-vehicle occupant order system;
  ii) a receipt position output indicating the customer who placed the order is at the order receipt location; and
  iii) an intermediate location output indicating the customer is proximate said intermediate locating position;
 c) an intermediate locating position located on a path of travel between said fuel dispenser and said order receipt position, said intermediate locating position having third remote communications electronics adapted to communicate with the in-vehicle occupant order system; and
 d) a control system associated with said first remote communications electronics of said fuel dispenser, said third remote communications electronics of said intermediate locating position and said second remote communications electronics and said output of said order receipt position, said control system adapted to:
  i) communicate with the in-vehicle occupant order system through said first remote communications electronics when said remote communications unit is proximate said fuel dispenser;
  ii) communicate with the in-vehicle occupant order system through said third remote communications electronics when said remote communications unit is proximate said intermediate locating position indicating said customer is near said intermediate locating position;
  iii) provide said intermediate location output indicating the customer is proximate said intermediate locating position;
  iv) communicate with the in-vehicle occupant order system through said second remote communications electronics when the in-vehicle occupant order system is proximate said order receipt location; and
  v) identify the order at the order receipt location associated with the in-vehicle occupant order system of the customer who placed the order at the order entry user interface of the fuel dispenser and provide said output indicating the customer who placed the order is at the order receipt location.

36. The multistage order system of claim 35 wherein said order receipt location is associated with a quick serve restaurant wherein the customer may order food or drink at the fuel dispenser and pick up the food order at said order receipt location, said order receipt location further associated with an order preparation location having an order preparation output, said control system associated with said order preparation output and adapted to control said order preparation output to indicate the customer associated with the order is at said intermediate location wherein processing the order for the customer is effected when the customer is determined to be at said intermediate location.

37. The multistage order system of claim 36 wherein the order preparation output is configured to instruct order preparation to begin when the customer is at the intermediate location.

38. The multistage order system of claim 35 wherein said control system includes a dispenser controller located with said fuel dispenser and adapted to operate said first remote communications electronics.

39. The multistage order system of claim 35 wherein said control system includes an order processing controller associated with said order receipt location and adapted to operate said second and third communications electronics.

40. A multistage order system for a fueling environment comprising:
 a) a fuel dispenser operatively associated with a first receiver for receiving indicia via remote communications from an in-vehicle occupant order system associated with a customer;
 b) an order receipt location where the customer receives the order, said order receipt located apart from said dispenser and operatively associated with a second receiver for receiving the indicia via remote communications from the in-vehicle occupant order system associated with a customer;
 c) a control system operatively associated with said first receiver and said second receiver;
 d) said first receiver adapted to receive indicia from the in-vehicle occupant order system when said remote communications unit is proximate said fuel dispenser;
 e) said control system adapted to associate an order received from the in-vehicle occupant order system with the in-vehicle occupant order system;
 f) said second receiver adapted to receive said indicia from the in-vehicle occupant order system when the in-vehicle occupant order system is proximate said order receipt location; and
 g) said control system adapted to relate the indicia received at said second receiver with the indicia received at said first receiver and the order associated therewith.

41. A method of correlating remote orders using remote communications units comprising:
 a) entering an occupant order at an in-vehicle occupant order system;
 b) communicating with the in-vehicle occupant order system at a station to receive the occupant order;
 c) processing the occupant order at a remote receiving location;
 d) communicating with the in-vehicle occupant order system at the remote receiving location to associate the in-vehicle occupant order system with the processed order; and
 e) providing a customer associated with the in-vehicle occupant order system with ordered goods or services.

42. The method of claim 41 wherein step b) includes transmitting an in-vehicle occupant order system identifier from the in-vehicle occupant order system to the station and step d) includes transmitting the in-vehicle occupant order system identifier from the in-vehicle occupant order system to the remote receiving location.

43. The method of claim 41 wherein step b) includes transmitting an order code to the in-vehicle occupant order system from the station and step d) includes transmitting the order code from the in-vehicle occupant order system to the remote receiving location.

44. The method of claim 41 wherein after step b) and before step d) the following steps are provided:
  i) communicating with the in-vehicle occupant order system at an intermediate location along a path of travel between the station and the remote receiving location; and
  ii) providing an alert that a customer is en route to pick up the order.

45. An in-vehicle ordering system comprising:
  a. an occupant interface having a display and input device located within a vehicle cabin, said occupant interface adapted to provide a selection of items to order from a restaurant or store and receive an occupant order via said input device;
  b. vehicle communication electronics associated with said occupant interface and adapted to wirelessly transmit the occupant order for ultimate receipt at the restaurant or store; and
  c. a control system configured to display said selection of items to order on said display, determine the occupant order based on occupant input received via said input device, and effect wireless transmission of the occupant order.

\* \* \* \* \*